United States Patent [19]
Ohmori et al.

[11] Patent Number: 5,509,524
[45] Date of Patent: Apr. 23, 1996

[54] ARTICLE TRANSPORTATION PROCESSING SYSTEM

[75] Inventors: Toshiyuki Ohmori; Shigemi Hatanaka, both of Chiba; Yasuhiro Honma, Saitama; Hiroaki Kobayashi; Eiichi Saito, both of Chiba; Ichiro Hamano, Ishikawa, all of Japan

[73] Assignee: Kao Corporation and Shibuya Kogyo Co., Ltd., Tokyo, Japan

[21] Appl. No.: 180,934

[22] Filed: Jan. 11, 1994

Related U.S. Application Data

[62] Division of Ser. No. 954,901, Sep. 30, 1992, Pat. No. 5,337,796.

[30] Foreign Application Priority Data

| Sep. 30, 1991 | [JP] | Japan | 3-276476 |
| Sep. 30, 1991 | [JP] | Japan | 3-276479 |
| Sep. 30, 1991 | [JP] | Japan | 3-276480 |
| May 15, 1992 | [JP] | Japan | 4-148509 |

[51] Int. Cl.$^6$ .................................................. B65G 29/00
[52] U.S. Cl. ..................... 198/465.1; 198/690.1; 198/803.01
[58] Field of Search ................ 198/345.1, 465.1, 198/690.1, 803.01, 345.3

[56] References Cited

U.S. PATENT DOCUMENTS

| 3,052,340 | 9/1962 | Lyons et al. | 198/803.01 |
| 3,090,478 | 5/1963 | Stanley | 198/803.01 |
| 3,092,237 | 6/1963 | Miller | 198/803.01 |
| 3,941,237 | 3/1976 | MacGregor | 198/803.01 |
| 4,159,762 | 7/1979 | Bulwith | 198/803.01 |
| 4,713,883 | 12/1987 | Santandrea et al. | 198/465.1 |
| 5,224,585 | 7/1993 | Blanco et al. | 198/803.01 |

*Primary Examiner*—Joseph E. Valenza
*Attorney, Agent, or Firm*—Dvorak and Traub

[57] ABSTRACT

A transporting apparatus for a container 1 has a sequentially arranged filling process path 13C for performing filling process for the container 1, a empty container infeed starwheel 12 for introducing the container 1 into the filling process path 13C, a discharge starwheel 16 for feeding out the container 1 from the filling process path 13C and a discharge conveyer 17. One of the empty container infeed starwheel 12, and the discharge starwheel 16 and the discharge conveyer 17 is arranged in an intersecting manner with respect to the filling process path 13C with a different level.

3 Claims, 17 Drawing Sheets

FIG.18(A)    FIG.18(B)
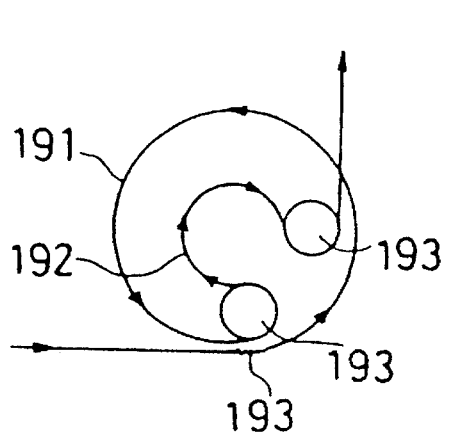
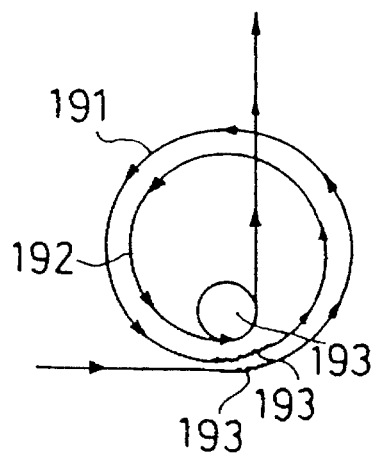
FIG.18(C)
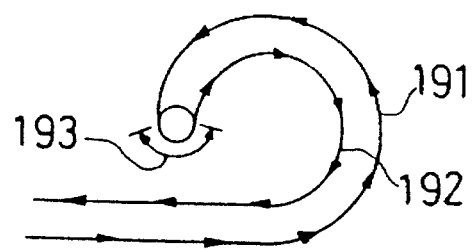
FIG.19(A)    FIG.19(B)
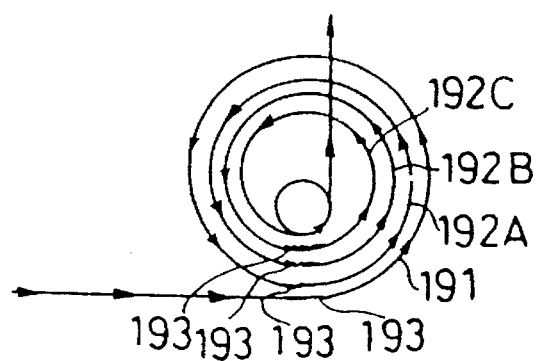
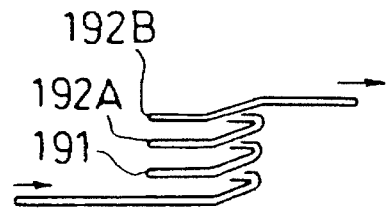

ARTICLE TRANSPORTATION PROCESSING SYSTEM

This is a divisional of application(s) Ser. No. 07/954,901 filed on Sep. 30, 1992 now U.S. Pat. No. 5,337,796.

BACKGROUND OF THE INVENTION

1. Field of the Invention

The present invention relates to a transportation processing system, suitable for filing and packaging facilities incorporating filling apparatus and packaging apparatus.

2. Description of the Related Art (A) Article Transportation System

Japanese Unexamined Patent Publication (Kokai) No. 58-82801 discloses a high speed filling apparatus for packaging bags, in which a filling apparatus is arranged for filling an article into package bags.

The disclosed prior art includes a supply portion 3 including a star wheel 3A for introducing packaging bags 1 into a filling process path 2 and a feeding out portion 4 including a star wheel 4A for feeding filled packing bags 1 out of the filling process path 2, as shown in FIG. 9.

However, in the prior art, the supply portion 3 and the feeding out portion 4 are arranged on a plane common to the filling process path 2 and the positions outside of the filling process path 2. With such arrangement, the filling process path 2 is defined on a rotary table, and the areas at the periphery of the rotary table occupied by the supply portion 3 and the feeding out portion 4 become substantially large. As a result, the effective processing angle θA becomes small (e.g. 260°). Therefore, in order to obtain a sufficient processing path length, the facility inherently become large.

It is an object of the present invention to provide a transportation system which can provided a larger effective processing area of a process path in connection with a supply portion and a feeding out portion of an annular processing path for articles, and thus can provide a longer effective process path length without requiring increasing of the size of a facility.

(B) Filling Apparatus

Conventionally, there have been proposed filling apparatuses, as disclosed in Japanese Unexamined Patent Publication No. 58-82801 or, in the alternative, in Japanese Unexamined Patent Publication No. 56-23401. Theses filling apparatuses comprise a filling process path for filling an article or articles in a container and other process path for performing other processes for the container and connected to the filling process path. The content to be placed within the container is filled during transportation of the container. Also, the container is subject other processes during transportation of the container.

Here, the above-mentioned other processes include a cleaning process for cleaning empty containers by pressurized air, a capping process for fitting caps on the filled containers, and a heat sealing process for forming a heat seal on the openings of the filled containers.

However, the foregoing prior art is inadequate on the following points ① and ②.

① In the filling apparatus disclosed in Japanese Unexamined Patent Publication No. 58-82801,the machines are separated for the filling process, and each of the other processes. Hence, a plurality of machines are interconnected requiring substantial space for installation.

② In the filling apparatus disclosed in Japanese Unexamined Patent Publication No. 56-23401,the filling process path and paths for the other processes are provided within a single annular area (rotary table), thereby decreasing the required installation space. However, since only the processing means is provided in each process path, the processing capacity of the overall filling apparatus tends to be determined by the processing means of the lowest productivity. In this prior art, in order to obtain higher processing performance, it is necessary to provide a plurality of processing apparatuses in each process path. However, when a plurality of processing means are provided for each of a plurality of process paths included in single annular area, it is necessaly to increase the installation space.

Therefore, it is an object of the invention to enhance productivity of the filling process and other processes and at the same time minimize the installation space of the overall filling apparatus.

(C) Article Positioning Apparatus

Article positioning apparatuses are disclosed in Japanese Unexamined Patent Publication No. 56-52197 and Japanese Unexamined Patent Publication No. 59-3760. This prior art includes guide pins extending from magnet devices. The guide pins extends through center holes of an annular metal strip or disk holders as articles to be positioned. Thereafter, the articles to be positioned are down onto the magnet device to be held thereon.

However, the above-mentioned prior art is inadequate on points ① and ② as follows.

① Before extending through the central opening of the articles to be positioned, a preliminary operation for aligning the guide pin with the article is required.

② Upon inserting the guide pin into the central openings of the articles, complicate mechanical means, such as a cam mechanism are required for driving the guide pin toward the central openings of the articles to be positioned.

Therefore, it is an object of the present invention to simplify the positioning operation and construction of the device for positioning the articles at desired positions on a support base.

(D) Article Processing Apparatus

Conventionally, known rotary type filling apparatuses include a rotary table and a guide members circumferentially disposed about the rotary table at regular intervals for supporting the containers.

In such a conventional rotary type filling apparatus, a supply star wheel and a feed out star wheel are provided adjacent to the rotary table. By rotation of the supply star wheel, the containers are supplied into respective guide members so that the guide members may support the containers. The containers supported by the guide members are then fed out of the rotary table by the feed out star wheel.

However, since the conventional guide members are fixed on the rotary table in the condition orienting engaging recesses engaged with the container radially outward, supplying and taking the containers for the guide members has to be performed to supply the container from the radially outside of the guide member and to take out the container toward radially outside.

Therefore, in the prior art, the opening mouth of the engaging recesses of the guide member are made larger so that supplying and taking out of the container to and from the guide member can be smoothly performed.

The necessity of the larger opening mouth of the engaging recesses of the guide member result in inaccurate positioning of the container held in the engaging recess.

In addition, as set forth above, since the conventional guide member receives and disposed of the container from the radially outside, it may have low applicability.

Therefore, it is an object of the present invention to provide an article processing apparatus which can accurately position a container held in a holder, and can have high applicability.

SUMMARY OF THE INVENTION (A) Article Transporting Apparatus

According to one aspect of the invention, an article transporting apparatus comprises:

an annular process path for processing an article;

a supply portion for instructing the article into the process path;

a feeding out portion for feeding out the article from the process path, the feeding out portion forming a series of transporting path of the article together with the process path and the supply portion; and at least one of the supply portion and the feeding out portion being arranged in an intersecting manner with the process path with an elevational level difference.

The supply portion may be arranged one of inside and outside of the process path and the feeding out portion is arranged at the opposite side.

Also, the article may be transported through the supply portion, the process path and the feeding out portion by a magnetic force, and transferred in the condition held by the magnetic force.

Furthermore, the process path may include a positioning means for positioning the article at a predetermined position.

According to the present invention, since the supply portion and the feeding out portion are arranged in an intersecting manner relative to the annular article processing path, the area occupied by the supply portion and the feeding out portion on the circumference of the process path can be reduced to enable an increase in the effective process path length.

Also, according to the present invention, since the supply portion is provided at one of the inner and outer sides of the annular article process path and the feeding out portion is arranged at the other side, the area occupied by the supply portion and the feeding out portion on the circumference of the process path can be reduced to enable an increase in the effective process path length.

Namely, according to the present invention, in connecting the supply portion and the feeding out portion of the annular article processing path, the effective process range of the process path can be increased to enable increasing the effective process path length without increasing the size of the facility.

(B) Filling Apparatus

According to another aspect of the invention, a filling apparatus comprises:

a filling process path for filling a filling article in a container during transportation of the container therethrough; and a second process path for providing another process for the container during transportation of the container therethrough, the filling process path and the second process path being formed essentially into annular configuration and being arranged in the positional relationship that one is positioned inside of the other, a plurality of filling process means for filling a content in the container transported along the filling path, and a plurality of another process means for providing second process for the container transported along the second process path.

The container may be held with a magnetic force in the filling process path and the another process path, and transferred between both paths in a condition held by the magnetic force.

Also, the filling process path may include a positioning means for positioning the container relative to each filling process means.

According to the present invention, the following effects and advantages can be obtained.

Since a plurality of process means are provided for the filling process path and second process path, high production performance in the filling process and second process can be obtained.

Also, despite of the fact that a plurality of processing means are provided, since the each process path is provided inside and outside of the annular form, the installation space of the overall filling apparatus can be minimized.

(C) Article Positioning Apparatus

According to a further aspect of the invention, an article positioning apparatus for positioning an article on a supporting base, comprises:

a magnetic drawing means including a magnet provided around a positioning center of the supporting base and a magnet mounted on the article side for magnetically drawing the article onto the supporting base; and a magnetic coupling means for coupling the supporting base and the articles by means of a positioning pin driven by a magnetic drawing force or a magnetic repulsing force.

The coupling means may comprise a positioning pin stored in either the supporting base side or the article side, a positioning hole provided at the opposite side to the positioning pin, and a pin driving magnetic member movable relative to the positioning pin so that the pin driving magnetic member applies a magnetic drawing force or a magnetic repulsive force to the positioning pin at the mating position resulting in the positioning pin engaging the positioning hole.

According to the present invention the effect and advantages listed in ① and ② can be obtained.

① The article is drawn about the positioning center of the supporting base by the magnetic drawing means and then coupled with the supporting base by the positioning pin of the magnetic coupling means. At this time, the magnet of the article side and the magnet of the supporting base side, which form the magnetic drawing means draw toward each other to substantially align the magnetic centers. As a result, the article can be roughly positioned about the positioning center on the supporting base in self-alignment. Accordingly, after being roughly positioned on the supporting base by the magnetic drawing means, the article is then coupled with the supporting base by the positioning pin of the magnetic coupling means. Namely, in advance of the coupling operation by the positioning pin, the article can be roughly positioned on the supporting base by the magnetic drawing means. Therefore, the positioning operation can be simplified and made easier.

② Since the positioning pin is driven by the magnetic drawing force or the magnetic repulsive force, it does not require a complicated mechanical drive mechanism, such as cam, the construction can be simplified.

(D) Article Processing Apparatus

According to a still further aspect of the invention, an article processing apparatus comprises:

a first rotary body provided for rotation;

a plurality of transporting means provided on the first rotary body with a circumferential regular interval and holding and transporting a holder receiving a container;

a second rotary body being rotated in synchronism with the first rotary body;

a plurality of guide members provided on the second rotary body with a circumferential regular interval and guiding radial movement of the holder;

a magnetic arranged below the motion path of each of the guide members and drawing the holder engaging with the guide member to position the holder at a predetermined position in the radial direction;

each of the transporting means including a pivoting arm provided on the first rotary body, a pivot mechanism for pivoting the arm in synchronism with rotation of the first rotary body, a holding member provided rotatably on the arm and holding the holder, and rotating mechanism for driving the holding member in synchronism with rotation of the first rotary body; and the transporting means transferring the holder held in the holding member to each of the guide members of the second rotary member by a pivoting motion of the arm and rotation of the holding member.

With this construction, the holder transferred to the guide member of the second rotary body is circumferentially positioned by engagement with the guide member and radially positioned by the drawing force of the magnet. Therefore, the accurate positioning can be achieved for the holder transferred to the second rotary body.

In addition, the holder can be fed out inwardly along the guide member even at the positioned by engagement with the guide member.

Accordingly, the holder transferred to the second rotary body can be accurately positioned and can provide the article processing apparatus with a wide range of processing applicability.

BRIEF DESCRIPTION OF THE DRAWINGS

The present invention will be understood more fully from the detailed description given below and from the accompanying drawings of the preferred embodiment of the invention, which, however, should not be taken to be limitative to the invention, but are for explanation and understanding only.

In the drawings:

FIGS. 18(A)–(C) are illustrations showing modifications of the present invention;

FIGS. 19(A)–(B) are illustrations showing additional modifications of the present invention;

DESCRIPTION OF THE PREFERRED EMBODIMENT (FIRST EMBODIMENT) (see FIGS. 1–9)

Figure 1:
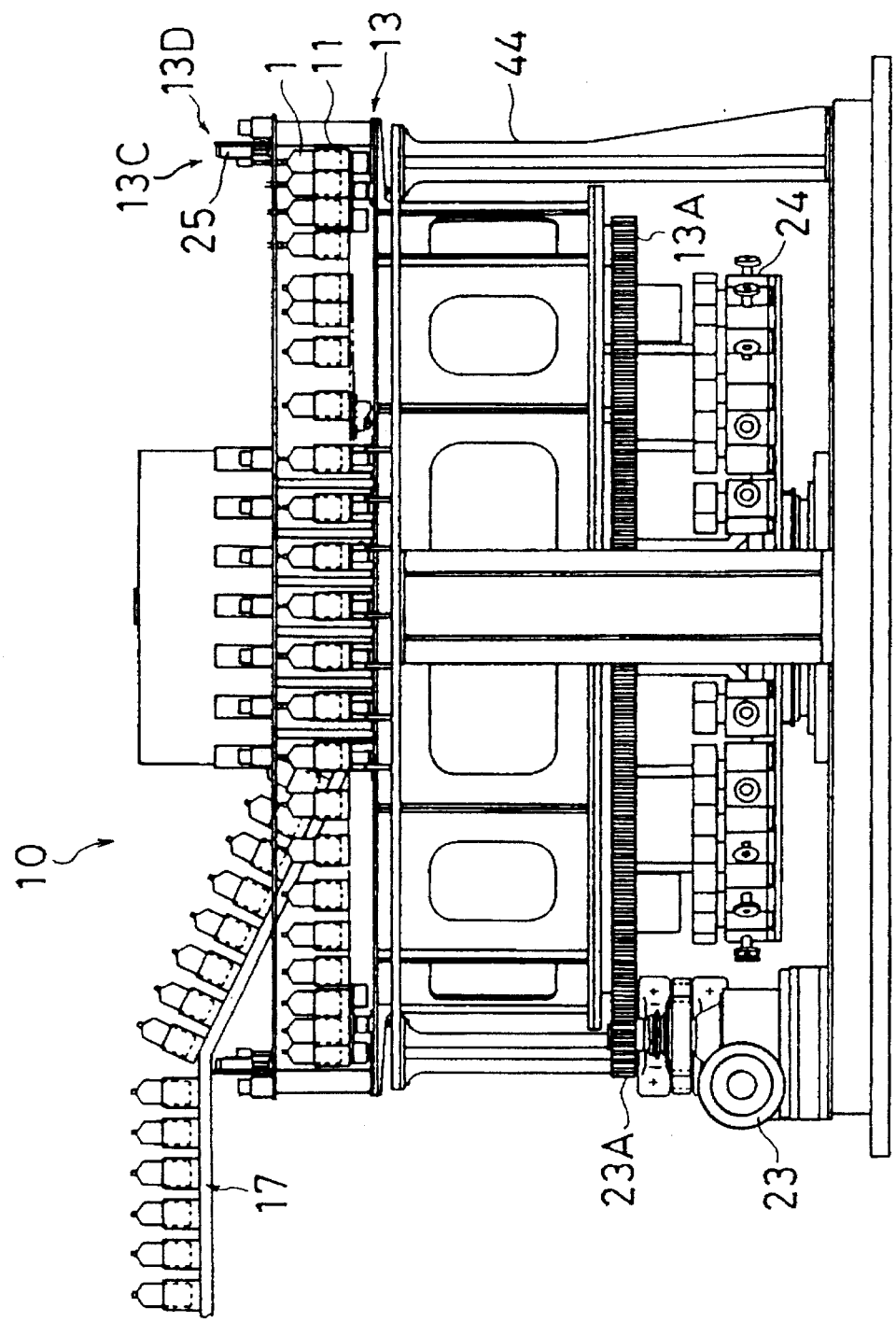
FIG. 1 is a longitudinal section showing a filling apparatus, to which the present invention is applied.
Figure 2:
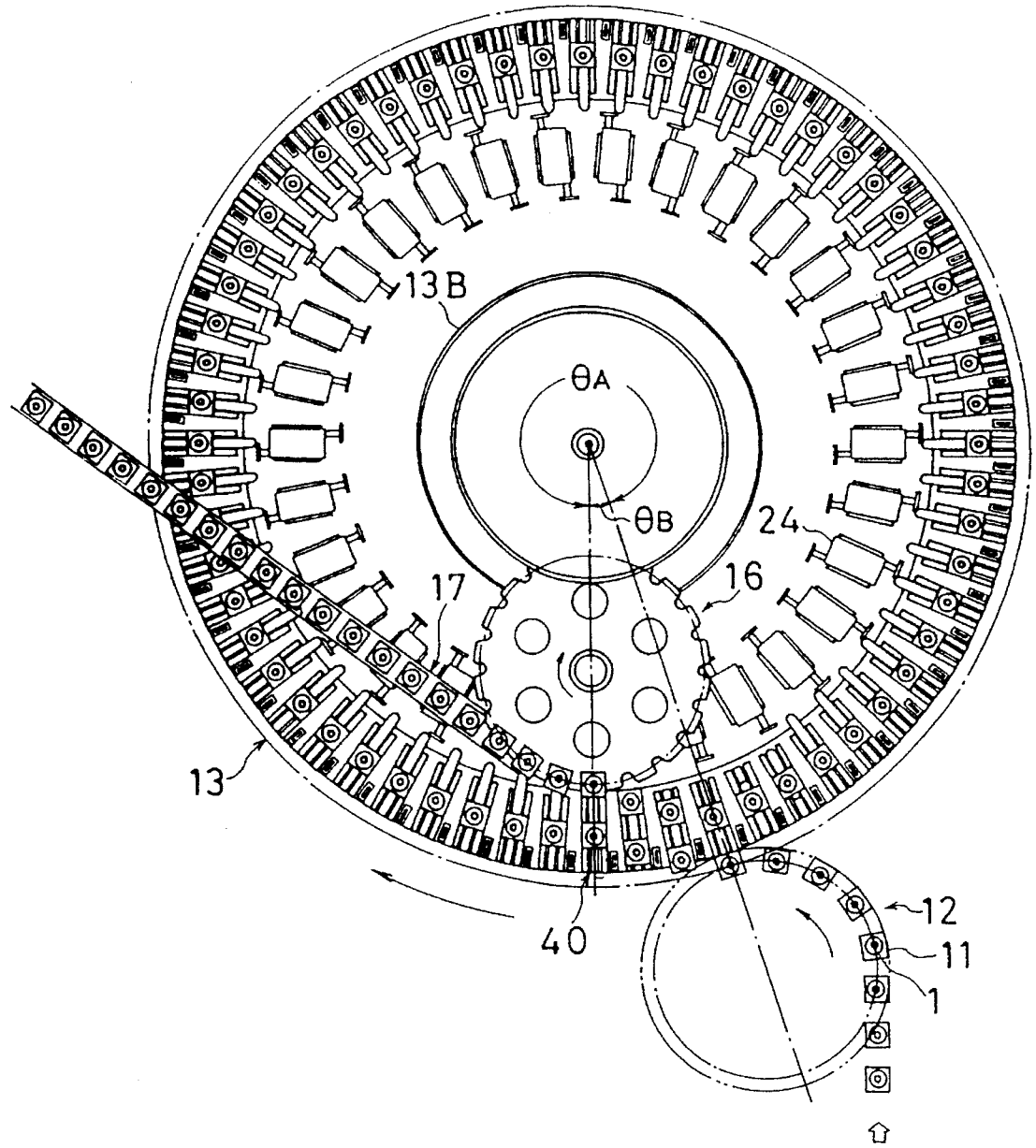
FIG. 2 is a plan view of the filling apparatus of FIG. 1.
Figure 3A:
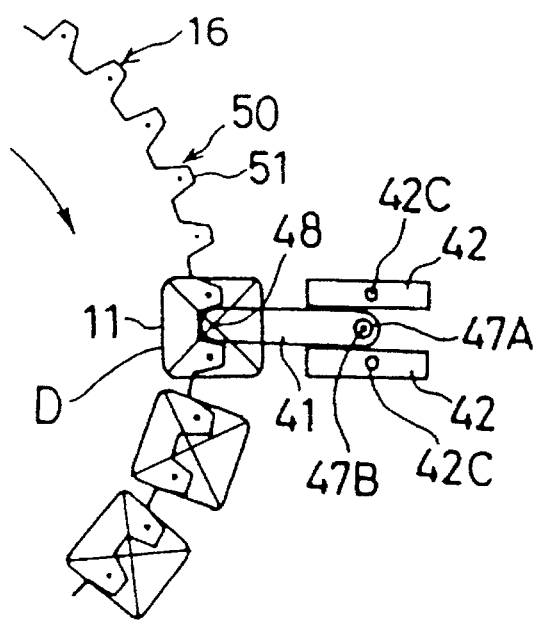
FIG. 3 is an illustration showing a container transferring condition between a filling starwheel and a discharge starwheel.
Figure 3B:
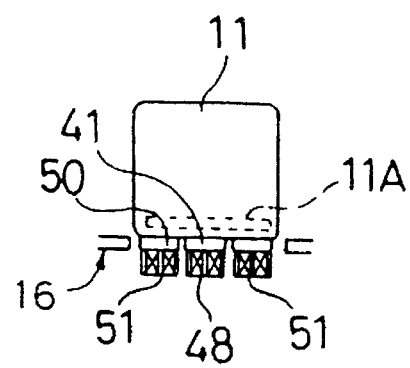

As shown in FIGS. 1 and 2, a filling apparatus 10 is designed to fill a content, such as detergent, in a container 1 set in a container fixing member 11, and subsequently set a cap on the container 1.

The filling apparatus 10 has an empty container infeed starwheel 12, a filling starwheel 13, a discharge starwheel 16, a discharge conveyer 17. The starwheels 12, 13 and 16 and the discharge conveyer 17 are driven in synchronism with each other. At this time, a gear 23A fixed on an output shaft of a motor 23 is meshed with a gear 13A fixed on the filling starwheel 13. On the other hand, a gear 13B fixed to the filling starwheel 13 is meshed with a gear (not shown) on the discharge starwheel 16. By these gear trains, respective starwheels 13 and 16 are driven in cooperation with the revolution of the motor 23.

Here, the filling starwheel 13 forms an annular filling process path 13C. The empty container infeed starwheel 12 forms a supply portion, and the discharge starwheel 10 and the discharge conveyer 17 form a feeding out portion.

In the filling apparatus 10, the empty container infeed starwheel 12 is arranged at the position outside of the annular filling process path 13C defined by the filling starwheel 13. The discharge starwheel 16 and the discharge conveyer 17 are arranged inside of the annular filling process path 13C.

On the other hand, in the filling apparatus 10, the feeding conveyer 17 is arranged at a different level than the filling process path 13C so that it intersects with the filling process path 13C with an ascending gradient.

Hereafter, discussion will be given for the filling and capping process.

(1) The empty container 1 held by the container fixing member 11 is transferred from the empty container infeed starwheel 12 to the filling starwheel 13 by means of a transferring mechanism which will be discussed later.

(2) The container fixing member 11 transferred to the filling starwheel 13 is shifted to the filling process path 13 set in each filling head 13D by a holding mechanism which will be discussed later.

Here, the filling starwheel 13 has sixty filling heads 13D. Each filling head 13D is provided with a metering device 24 and a filling device 25. The container 1 set to each filling head 13D is filled with a proper amount of content through a nozzle of the filling device 25 during travel from the inlet side to the outlet side of the filling process path 13C.

(3) The container 1, for which filling of the content in the filling starwheel 13 is completed, is transferred together with the container fixing member 11 to the discharge starwheel 16 at the outlet side of the filling process path 13C by a transferring mechanism which will be discussed later. Subsequently, the filled container 1 and the container fixing member 11 are transferred from the discharge starwheel 16 to the discharge conveyer 17.

(4) The container 1 with the container fixing member 11 transferred to the discharge conveyer 17 is transferred to a next process by a transporting mechanism which will be discussed later.

Hereafter will be discussed the transferring mechanism, the holding mechanism and the transporting mechanics for the container fixing member 11 in respective of the starwheels 12, 13 and 16 and the discharge conveyer 17.

The container fixing member 11 houses a ring shaped permanent magnet 11A at the bottom thereof. The center hole of the permanent magnet 11A serves as a first positioning hole 11B. The container fixing member 11 also has second positioning holes 11C at both lateral sides aligned in the diametrical direction, through the bottom.

(A) Transferring from the Empty Container Infeed starwheel 12 to the Filling starwheel 13, the Holding at the Filling starwheel, the Transfer from the Filing Starwheel 13 to the Discharge starwheel 16 and the Holding at the Discharge starwheel 16 will now be discussed. (FIGS. 3, 5, 6 and FIG. 7)

The filling apparatus 10 has an article transferring and holding device 40 on each filling head 13D of the filling starwheel 13.

The article transferring and holding device 40 includes a movable base 41 and left and right stationary bases 42. The movable base 41 is mounted on a guide rail 43 arranged on the filling starwheel 13. The movable base 41 carries a cam follower 46 engaged with a movable base driving cam groove 45 supported on the outer peripheral frame 44 of the filling apparatus 10. With this construction, the movable base 41 is reciprocally movable between an outer end position and an inner end position set in the radial direction of the filling starwheel 13. The stationary bases 42 are respectively secured on both sides of the movable base 41.

The movable base 41 has a positioning device 47 at the outer end. The positioning device 47 includes an article fixing magnet 47A formed of a ring-shaped permanent magnet for magnetically drawing and fixing the permanent magnet 11A of the container fixing member 11, and a first positioning pin 47B enclosed in the central hole portion of the article fixing magnet 47A. A permanent magnet 47C is provided at the lower end of the first positioning pin 47B. On the other hand, a magnet supporting portion 42A provided on the stationary base 42 has a pin drive magnet 47D formed with a permanent magnet. The pin drive magnet 47D is opposed to the permanent magnet 47C of the first positioning pin 47B when the filling head 13D is positioned in a transferring region ($\theta B$) with the empty container infeed starwheel 12 and the discharge starwheel 16 in the circulating line of the filling starwheel 13 and the movable base 41 is set at the inner end position to apply a magnetic repulsive force to the permanent magnet 47C so that the first positioning pin 47B projects upwardly. As will be discussed later, the first positioning pin 47B engages with the first positioning hole 11B of the container fixing member 11 at this position. On the other hand, when the filling head 13D is positioned in a transferring region with the empty container infeed starwheel 12 and the discharge starwheel 16 in the circulating line of the filing starwheel 13 and the movable base 41 is out of the inner end position and shifting toward the outer end position, the pin drive magnet 47D will never oppose the permanent magnet 47C of the first positioning pin 47B so that a repulsive magnetic force will never act. Therefore, the first positioning pin 47B is enclosed in the central hole portion of ring-shaped article fixing magnet 47A by its own weight. Therefore, as will be discussed later, the first positioning pin 47B is released from engagement with the first positioning hole 11B of the container fixing member 11. It should be noted the permanent magnet 47C of the first positioning pin 47B and the pin drive magnet 47D will oppose the same pole (for example, S pole) when they oppose each other so that the above-mentioned magnetic repulsive force can be generated.

Namely, in the positioning device 47, the ring-shaped article fixing magnet 47A forms the magnetic fixing means for fixing the container fixing member 11 onto the movable base 41. The first positioning pin 47B, the first positioning hole 11B and the pin drive magnet 47D form a magnetic cooperating means for cooperating the container fixing member 11 with the filling starwheel 13. Namely, in the positioning device 47, the container fixing member 11 cooperates with the movable base 41 by the positioning pin 47B of the magnetic cooperating means after being fixed about the positioning center on the movable base 41 by the magnetic fixing means. At this time, the article fixing magnet 47A and the permanent magnet 11A of the container fixing member 11 draw to each other so as to substantially align the centers of the magnets to each other. As a result, the container fixing member 11 is roughly positioned in self-aligned fashion about the positioning center on the movable base 41. Accordingly, the container fixing member 11 cooperates with movable base 41 by positioning pin 47B of the magnetic cooperation means after being roughly positioned on the movable base 41 in self-aligned fashion by the magnetic fixing means. Namely, since, in advance of cooperating operation by the positioning pin 47B, the container fixing member 11 is roughly positioned on the movable base 41 by the magnetic fixing means, the positioning operation can be made simple and easy.

In addition, the movable base 41 has a permanent magnet at the inner end for magnetically drawing the permanent magnet 11A of the container fixing member 11.

The left and right stationary bases 42 have second positioning pins 42C received in recesses 42B. Permanent magnets 42D are provided at the lower ends of the respective second positioning pins 42C. On the other hand, each of the left and right magnet supporting portions 41C provided on the movable base 41 are provided with three pin drive magnets 49A, 49B and 49C formed with permanent magnets. The pin drive magnetic 49A and 49C are adapted to oppose the permanent magnet 42D of the second positioning pin 42C to apply a magnetic drawing force to the permanent magnet 42D when the movable base 41 is set at the outer and inner end positions. By the magnetic drawing force, the second positioning pin 42C is retracted within the recess 42B. On the other hand, the pin drive magnet 49B is adapted to oppose the permanent magnet 42D of the second positioning pin 42C to apply the magnetic repulsive force to the permanent magnet 42D so that the second positioning pin 42C is projected out of the recess when the movable base 41 is positioned at the intermediate position between the outer and inner end positions. As will be discussed later, the second positioning pin 42C as projected from the recess engages the second positioning hole 11C of the container fixing member 11. It should be appreciated that the permanent magnet 42D of the second positioning pin 42C and the pin drive magnets 49A and 49C oppose opposite poles (S pole and N pole) at opposing positions to generate the magnetic drawing force as set forth above. On the other hand, the permanent magnet 42D of the second positioning pin 42C and the pin drive magnet 49B oppose the same pole as opposed to each other so as to generate the magnetic repulsive force.

The empty container infeed starwheel 12 and the discharge starwheel 16 respectively have article transferring and holding devices which have substantially the same construction. The article transferring and holding device 50 of the discharge starwheel 16 will be discussed below as an example.

The article transferring and holding device 50 has an article drawing magnet 51 arranged on the notched outer periphery of the discharge starwheel 16. The recessed portion of the article drawing magnet 51 is engageable with the inner end of the movable base 41 which forms the article transferring and holding device 40 of the filling starwheel 13. Here, the magnetic force of the article drawing magnet 51 is set to be greater than the magnetic force of the permanent magnet 48 of the movable base 41.

(A-1) The container fixing member 11 is transferred from the empty container starwheel 12 to the filling starwheel 13 and held by the filling starwheel 13 by the article transporting and holding device 40. (see FIG. 5)

When the filling head 13D of the filling starwheel 13 is positioned at a transferring position (A) where the empty container infeed starwheel 12 and the filling starwheel 13 are approached by each other, the movable base 41 is set at the outer end position. Then, the outer end of the movable base 41 engages with the recessed portion of the article drawing magnet provided on the notched outer periphery of the empty container infeed starwheel 12. At this time, the empty container infeed starwheel 12 draws the permanent magnet 11A of the container fixing member 11 on the article drawing magnet to hold the container fixing member. However, the positioning device 47 of the movable base 41 maintains the first positioning pin 47B in the retracted position and draws the permanent magnet 11A of the container fixing member 11 on the empty container infeed starwheel 12 to catch the container fixing member by the ring-shaped article drawing magnet 47A. By this, the permanent magnet 11A of the container fixing member 11 is drawn by both the article drawing magnet 47A and the article drawing magnet of the empty container infeed starwheel 12. However, since the magnetic force of the article drawing magnet 47A is designed to have a greater magnetic force than that of the article drawing magnet of the empty container infeed starwheel 12, the container fixing member 11 is transferred from the empty container infeed starwheel 12 to the filling starwheel 13 without causing displacement due to vibration.

When the filling head 13D of the filing starwheel 13 reaches the filling operation start position (B) from the above-mentioned transferring position (A), the movable base 41 is placed at the inner end position. At this time, the positioning device 47 of the movable base 41 projects the first positioning pin 47B so that the first positioning pin 47B may engage with the first positioning hole 11B of the container fixing member 11 to complete the positioning of the container fixing member 11. Then, the container fixing member 11 is held on the movable base 41. By this, the permanent magnet 11A of the container fixing member 11 is drawn by the article drawing magnet 47A and held when the filling starwheel 13 is rotated. Also, the container fixing member 11 is positioned by the first positioning pin 47B to move along the filling process path 13C.

Figure 5:
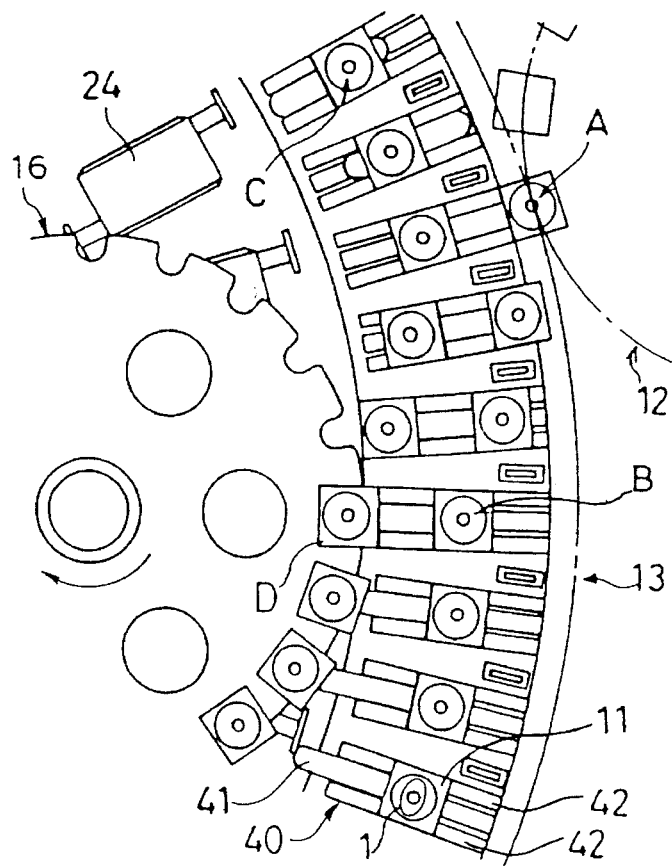
FIG. 5 is an illustration showing a container transferring and holding apparatus provided in the filling starwheel.
Figure 6:
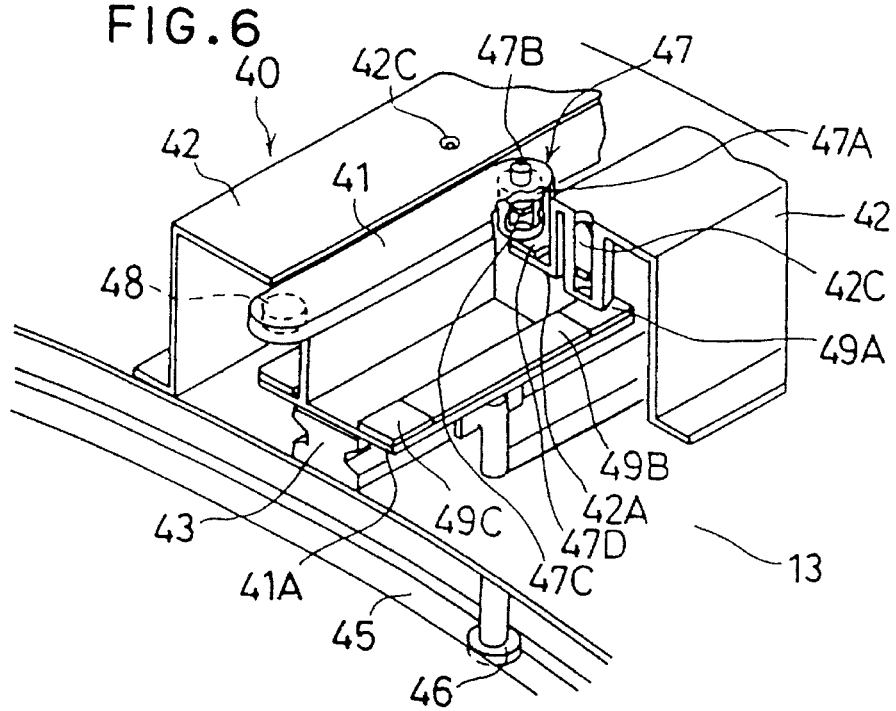
FIG. 6 is a perspective view of the container transferring and holding apparatus, which is illustrated in a partially cut out form.
Figure 7:
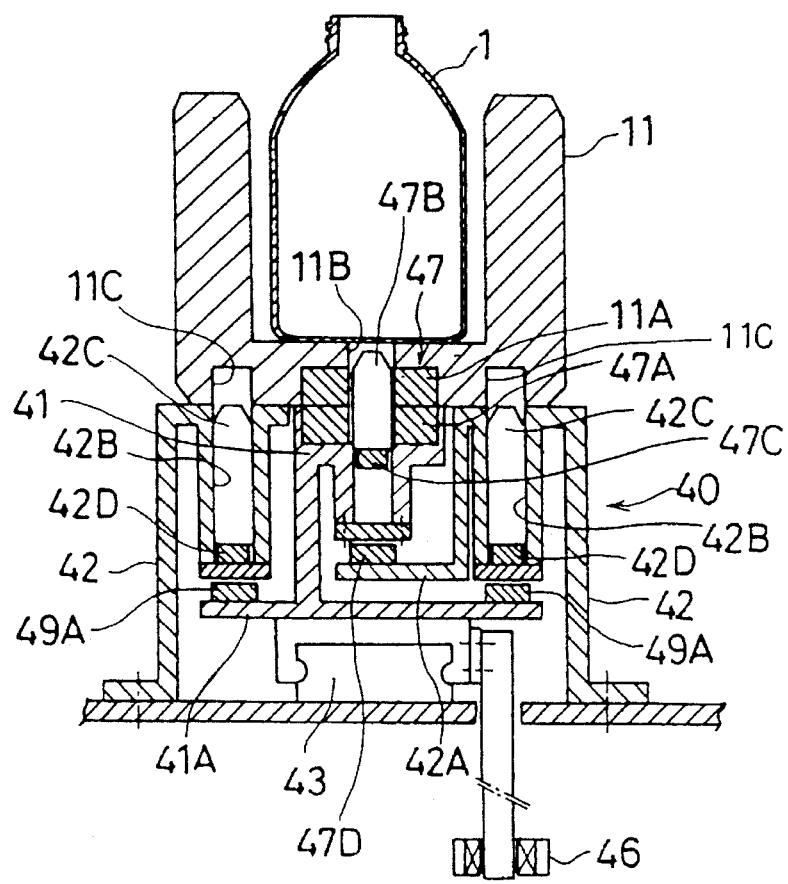
FIG. 7 is a section of the container transferring and holding apparatus.

(A-2) Next, the container fixing member 11 is transferred from the filing starwheel 13 to the discharge starwheel 16 by the article transferring and holding device 40 (see FIG. 5)

When the filling head 13D of the filing starwheel 13 passes across the filling operation end position (C), the movable base 41 shifts from the inner end position to the outer end position. At this time, the second positioning pins 42C of the stationary base 42 project to engage with two positioning holes 11C of the container fixing member 11 to hold the container fixing member. On the other hand, the positioning device 47 of the movable base 41 retracts the first positioning pin 47B so as to release engagement between the first positioning pin 47B and the first positioning hole 11B of the containing fixing member 11. By this, the movable base 41 shifts to the outer end position leaving the container fixing member 11 on the stationary base 42. From this position, the above-mentioned operation (A-1) is restarted to drawing and catching the new container fixing member 11 by the article drawing magnet 47A of the positioning device 47.

The container fixing member 11 past across the filling process path 13C and left on the stationary base 42 by engagement of the second positioning pins 42C and the second positioning holes 11C, is drawn and held by the permanent magnet 48 of the movable base 41 when the movable base 41 reaches the outer end position. When the movable base 41 moves from the outer end position to the inner end position to return, the second positioning pins 42C engaging with the second positioning holes 11C of the container fixing member 11 are retracted. Then, the container fixing member 11 is moved to a transporting position (D) at which the filling starwheel 13 and the discharge starwheel 16 approach each other in the condition where it is drawn and held by the permanent magnet 48 of the movable base 41. (see FIGS. 3 and 5)

At the transferring position (D), the inner end of the movable base 41 engages with the recessed portion of the article drawing magnet 51 provided on the notched outer peripheral portion of the discharge starwheel 16. By this, the permanent magnet 11A of the container fixing member 11 is drawn by both the permanent magnet 48 and the article drawing magnet 51 of the discharge starwheel 16, simultaneously. However, since the article drawing magnet 51 is designed to have a greater magnetic force than that of the permanent magnet 48, the container fixing member 11 can be transferred from the filing starwheel 13 to the discharge starwheel 16 without causing displacement due to vibration.

(A-3) Next, the container fixing member 11 is held on the discharge starwheel 16 by the article transferring and holding device 50 in the following manner. (see FIG. 3)

When the discharge starwheel 16 is rotated, the permanent magnet 11A of the container fixing member 11 is drawn and held by the article drawing magnet 51 of the discharge starwheel 16.

Figure 4A:
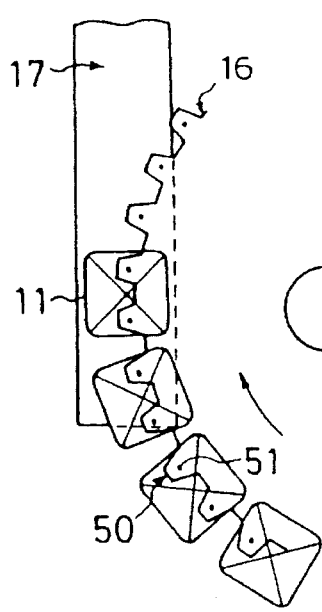
FIG. 4 is an illustration showing a container transferring condition between the discharge starwheel and a discharge conveyer.
Figure 4B:
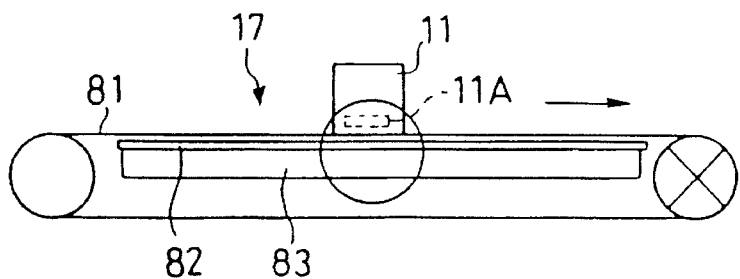

(B) Transferring from Discharge starwheel 16 to Discharge conveyer 17 and Holding in the Discharge conveyer 17 (see FIG. 4)

The discharge conveyer 17 is designed to mount the container fixing member 11 on a transporting belt 81 which travels a given transporting path, for transportation, as shown in FIG. 4. The discharge conveyer 17 is arranged on an article guiding magnet 83 via a non-magnetic belt receptacle 82 on the lower position along the article transporting path by the transporting belt 81. The article guiding magnet 83 can be placed with a magnetic body, such as an iron plate. Then, the feeing out conveyer 17 is arranged to overlap the upstream end of the transporting belt 81 with the notched outer peripheral portion of the discharge starwheel 16 to define the transferring position between the discharge starwheel 16 and the discharge conveyer 17 at this overlapping position. Here, the article guiding magnet 83 is provided greater magnetic force than that of the article drawing magnet 51 of the discharge starwheel 16.

Therefore, the transferring position where the discharge starwheel 16 and the discharge conveyer 17 overlap, the permanent magnet 11A of the container fixing member 11 is drawn both of the article drawing magnet 51 of the discharge starwheel 16 and the article guiding magnet 83 of the discharge conveyer 17. However, since the magnetic force of the article guiding magnet 83 is greater than that of the article drawing magnet 51 of the discharge starwheel 16, the container fixing member 11 is transferred to the discharge conveyer 17 without causing displacement due to vibration.

When the discharge conveyer 17 travels, the container fixing member 11 is transported with the transporting belt 81 with the permanent magnet 11A thereof drawn on the article guiding magnet 83.

Next, the effect and advantages of the present embodiment will be discussed.

① Since the feeding converter 17 is arranged to intersecting with the annular filling process path 13C, the area occupied by the discharge starwheel 16 and the discharge conveyer 17 on the circumference of the filling process path 13C become small. As a result, the effective process angle of the filling process path 13C can be made greater.

Also, since the empty container infeed starwheel 12 is arranged outside with respect to the annular filling process path 13C and the discharge starwheel 16 and the discharge conveyer 17 are arranged inside with respect to the annular filling process path 13C, the container supply portion and the container feeding out portion are never arranged at one of the inner and outer sides of the filling process path 13C. Therefore, the area to be occupied by the empty container infeed starwheel 12m, the discharge starwheel 16 and the discharge conveyer 17 become small so that the effective process range of the filling process path 13C can be expanded.

Namely, when the empty container infeed starwheel 12, the discharge starwheel 16 and the discharge conveyer 17 contact with the annular filling process path 13C, the effective processing angle $\theta A$ (318° in the shown embodiment) can be increased so as to allow a longer process path without increasing the size of the facility.

② When the container fixing member 11 is transferred through respective starwheels 12, 13, 16 and the discharge conveyer 17, the container fixing member 11 is held magnetically by the article transferring and holding devices 40 and 50, and transferred in a position held by the magnetic force, the container fixing member 11 and the container 1 can be transferred in the stable attitude without causing displacement due to vibration, with simple construction.

③ Since the positioning device 47 is provided in the filling process path 13C of the filling starwheel 13, the container fixing member 11 and the container 1 can be accurately positioned with respect to the filling device 25 of the filing head 13D with simple construction.

It is possible that instead of employing the container fixing member 11, a magnet or magnetic body can be contained in the container 1 per se so that each article transferring and holding device 40 and 50 holds this magnet or the magnetic body.

Also, the magnet provided in the article transferring and holding device 40 and 50 can be an electromagnet.

Modification of the present invention will now be discussed below.

Figure 8A:
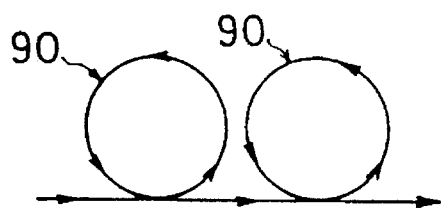
FIG. 8 is an illustration showing modification of the present invention.
Figure 8B:
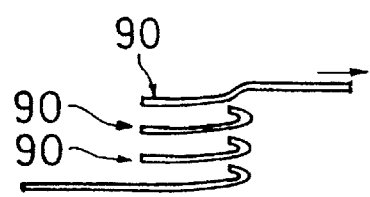
Figure 9:
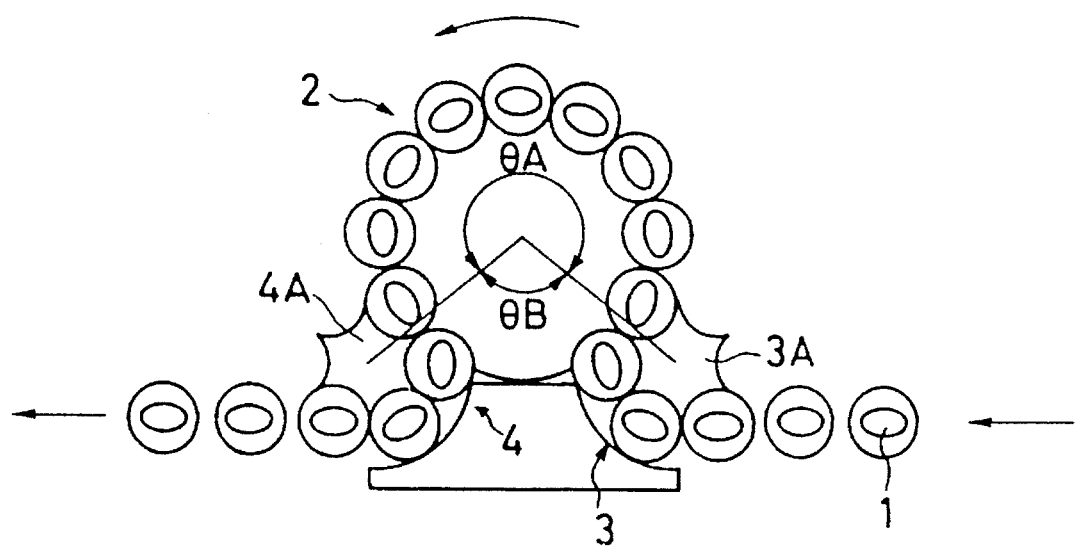
FIG. 9 is an illustration showing the prior art.

(1) The invention can be implemented by forming a unit transporting apparatus 90 with the supply portion, the process path and the feeding out portion and connecting a plurality of transporting apparatus 90 as shown in FIGS. 8(A) and 8(B). FIG. 8(A) shows the arrangement, in which the units are connected in the horizontal direction. FIG. 8(B) shows the arrangement in which the units are connected in the vertical direction.

(2) In the unit transporting apparatus constituted by the supply portion, the process path and the feeding out portion, the process portion may be established to perform a plurality of kinds of processes, such as an empty container cleaning process, a filling process, a cap setting process, and a heat sealing process.

(3) In the unit transporting apparatus constituted by the supply portion the process path and the feeing out portion, the annular process path is not limited to the single circumferential cycle but can be two or more circumferential cycles.

(SECOND EMBODIMENT) (see FIGS. 10–22)

Figure 10:
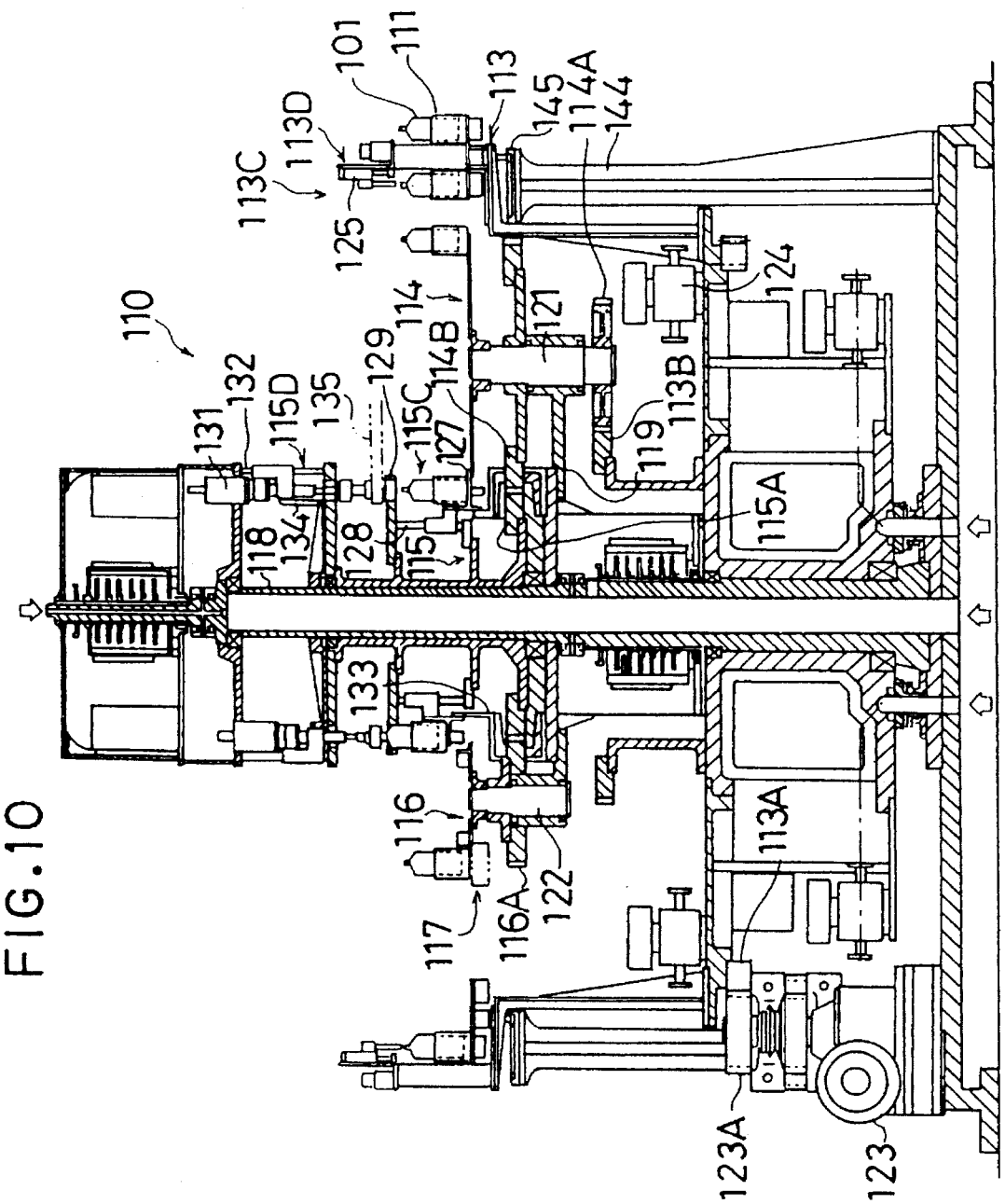
FIG. 10 is a longitudinal section showing an another filling apparatus, to which the present invention is applied.
Figure 11:
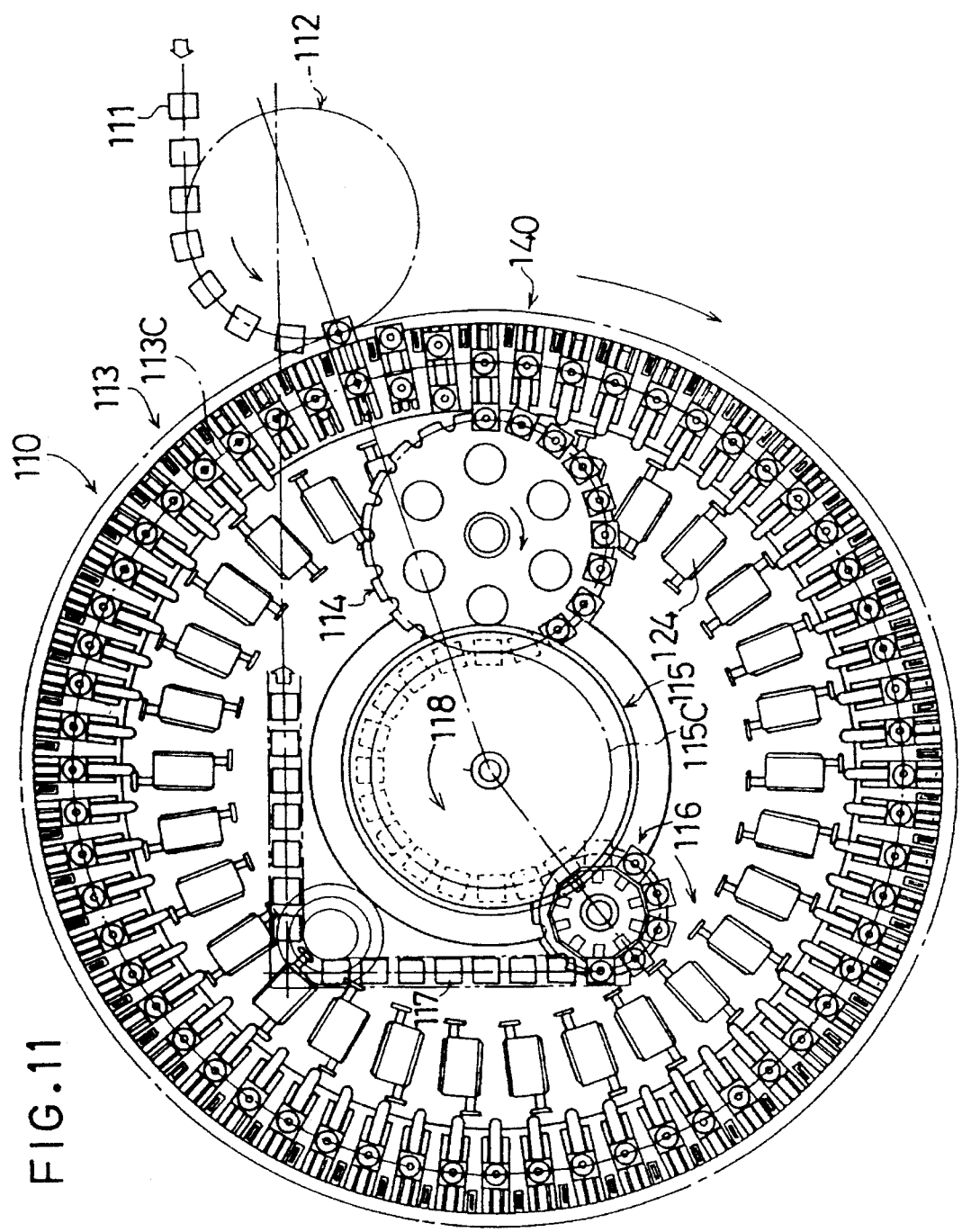
FIG. 11 is a plan view of the filling apparatus of FIG. 10.
Figure 12A:
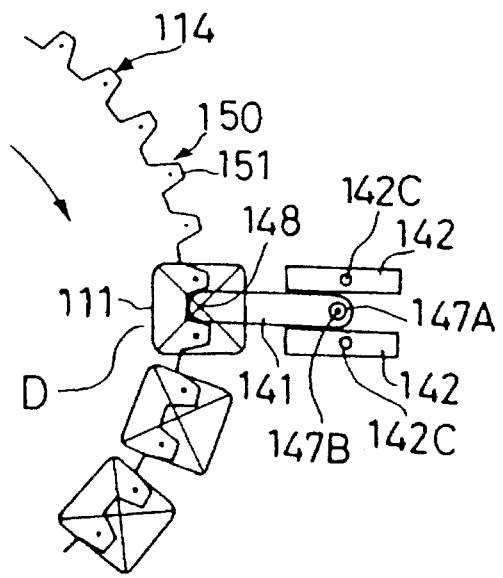
FIG. 12 is an illustration showing a container transferring condition between a filling starwheel and a first intermediate starwheel.
Figure 12B:
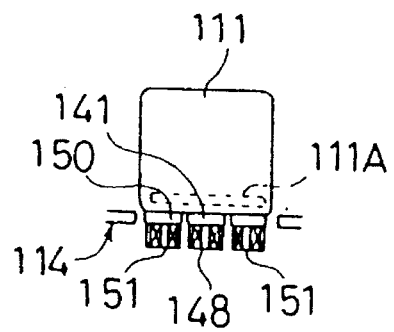

As shown in FIGS. 10 and 11, a filling apparatus 10 is designed to fill a content, such as detergent in a container 101 set in a container fixing member 111, and subsequently set a cap on the container 101.

The filling apparatus 110 has an empty container infeed starwheel 112, a filling starwheel 113, a first intermediate starwheel 114, a capping starwheel 115, a second intermediate starwheel 116, a discharge conveyer 117. The filling starwheel 113 and the cap starwheel 116 are supported for rotation about a center post 118. The intermediate starwheels 114 and 116 are supported for rotation about branch shafts 121 and 122 supported on the center pole 118 via a supporting member 119.

Respective of the starwheels 112–116 and the discharge conveyer 117 are driven in synchronism with each other. At this time, a gear 123A fixed on an output shaft of a motor 123 is meshed with a gear 113A fixed on the filling starwheel 113. On the other hand, a gear 113B fixed to the filling starwheel 113 is meshed with a gear 114A fixed on the first intermediate starwheel 114. A gear 114B fixed on the first intermediate starwheel 114 is meshed with a gear 115A fixed to the capping starwheel 115. To the gear 115A, a gear 116A fixed to the second intermediate starwheel 116 is meshed. By these gear trains, respective starwheels 113~116 are driven in cooperation with revolution of the motor 123.

Hereafter will be given a discussion for the filling and capping process by the filling apparatus 110.

(1) The empty container 101 held by the container fixing member 111 is transferred from the empty container infeed starwheel 112 to the filling starwheel 113 by means of a transferring mechanism which will be discussed later.

(2) The container fixing member 111 transferred to the filling starwheel 113 is shifted to the filling process path 113C set in each filling head 113D by a holding mechanism which will be discussed later.

Here, the filling starwheel 113 has sixty filling heads 113D. Each filling head 113D is provided with a metering device 124 and a filling device 125. The container 101 set to each filling head 113D is filled with a proper amount of content through a nozzle of the filling device 125 during travel from the inlet side to the outlet side of the filling process path 113C.

(3) The container 101, for which filling of the content in the filling starwheel 113 is completed, is transferred together with the container fixing member 111 to the first intermediate starwheel 114 by the later mentioned transferring mechanism. Subsequently, the container fixing member 111 transferred to the first intermediate starwheel 114 is held by the later mentioned holding mechanism and carried in the held position, and then transferred to the capping starwheel 115 via the later mentioned transferring mechanism.

(4) The container fixing member 111 transferred to the capping starwheel 115 is set on a support plate 127 of each capping head 115D by the later discussed holding mechanism to move along a capping process path 115C.

Here, the capping starwheel 115 contains twenty capping heads. Each capping head 115D is provided with a supporting plate elevating guide 128, a container positioning member 129, a cap setting device 131 and a cap setting device elevating guide 132. The container 101 set in each capping head 115D is risen together with the supporting plate 127 which is elevated by a supporting plate elevating cam 133 and positioned within a ring-shaped guide of the container positioning member 129, while the container travels from the inlet side to the outlet side of the capping process path 115C. On the other hand, the cap setting device 131 of each capping head 115D is risen by the cap setting device elevating cam 131 while it travels from the inlet side to the outlet side of the capping process path 115C, so as to catch a cap supplied from a cap supply table 135 and threadingly set the cap onto the container 101 which is positioned by the container positioning member 129 as set forth above.

(5) After completion of setting of the cap in the capping starwheel 115, the container 101 is transferred to the second intermediate starwheel 116 together with the container fixing member 111 at the outlet of the capping 115C by the later mentioned transferring mechanism. The container 101 transferred to the second intermediate starwheel 116 is held by the later mentioned holding mechanism and transferred to the discharge conveyer 117 by the later mentioned transferring mechanism after being transported to the transferring position.

(6) The container 101 transferred to the discharge conveyer 117 is fed out to the next process together with the container fixing member 111.

In the shown embodiment of the filling apparatus 110, the filling process path 113C on the filling starwheel 113 and the capping process path 115C on the capping starwheel 115 are formed essentially in annular configuration and arranged in the positional relationship that one is positioned inside relative to the other. As set forth above, a plurality of (sixty) filling heads 113D for filling content in the containers 101 transported on the filling process path 113C are provided, and a plurality of (twenty) capping heads 115D for setting cap on the containers 101 transported on the capping process path 115C are provided.

Hereafter will be discussed the transferring mechanism, the holding mechanism and the transporting mechanics for the container fixing member 111 in respective of the starwheels 112, 113~116 and the discharge conveyer 117.

The container fixing member 111 houses a ring shaped permanent magnet 111A at the bottom thereof. The center hole of the permanent magnet 111A serves as a first positioning hole 111B. The container fixing member 111 also has second positioning holes 111C at both lateral sides aligned in the diametrical direction, through the bottom.

( A ) Transferring from the Empty Container Infeed starwheel 112 to the Filling starwheel 113, the Holding at the Filling starwheel, the Transfer from the Filing Starwheel 113 to the First Intermediate starwheel 114 and the Holding at the First Intermediate starwheel 114 will now be discussed. (FIGS. 12, 15, 16 and FIG. 17)

The filling apparatus 110 has an article transferring and holding device 140 on each lower part of each filling head 113D of the filling starwheel 113.

The article transferring and holding device 140 includes a movable base 141 and left and right stationary bases 142. The movable base 141 is mounted on a guide rail 143 arranged on the filling starwheel 113. The movable base 141 carries a cam follower 146 engaged with a movable base driving cam groove 145 supported on the outer peripheral frame 144 of the filling apparatus 110. With this construction, the movable base 141 is reciprocally movable between an outer end position and an inner end position set in the radial direction of the filling starwheel 113. The stationary bases 142 are respectively secured on both sides of the movable base 141.

The movable base 141 has a positioning device 147 at the outer end. The positioning device 147 includes an article fixing magnet 147A formed of a ring-shaped permanent magnet for magnetically drawing and fixing the permanent magnet 111A of the container fixing member 111, and a first positioning pin 147B enclosed in the central hole portion of the article fixing magnet 147A. A permanent magnet 147C is provided at the lower end of the first positioning pin 147B. On the other hand, a magnet supporting portion 142A provided on the stationary base 142 has a pin drive magnet 147D formed with a permanent magnet. The pin drive magnet 147D is opposed to the permanent magnet 147C of the first positioning pin 147B when the filling head 113D is positioned in a transferring region with the empty container infeed starwheel 112 and the first intermediate starwheel 114 in the circulating line of the filling starwheel 113 and the movable base 141 is set at the inner end position to apply a magnetic repulsive force to the permanent magnet 147C so that the first positioning pin 147B projects upwardly. As will be discussed later, the first positioning pin 147B engages with the first positioning hole 111B of the container fixing member 111 at this position. On the other hand, when the filling head 113D is positioned in a transferring region with the empty container infeed starwheel 112 and the first intermediate starwheel 114 in the circulating line of the filing starwheel 113 and the movable base 141 is out of the inner end position and shifting toward the outer end position, the pin drive magnet 147D will never oppose the permanent magnet 147C of the first positioning pin 147B so that a repulsive magnetic force will never act. Therefore, the first positioning pin 147B is enclosed in the central hole portion of ring-shaped article fixing magnet 147A by its own weight. Therefore, as will be discussed later, the first positioning pin 147B is released from engagement with the first positioning hole 111B of the container fixing member 111. It should be noted the permanent magnet 147C of the first positioning pin 147B and the pin drive magnet 147D will oppose the same pole (for example, S pole) when they oppose each other so that the above-mentioned magnetic repulsive force can be generated.

Namely, in the positioning device 147, the ring-shaped article fixing magnet 147A forms the magnetic fixing means for fixing the container fixing member 111 onto the movable base 141. The first positioning pin 147B, the first positioning hole 111B and the pin drive magnet 147D form a magnetic cooperating means for cooperating the container fixing member 111 with the filling starwheel 113. Namely, in the positioning device 147, the container fixing member 111 cooperates with the movable base 141 by the positioning pin 147B of the magnetic cooperating means after being fixed about the positioning center on the movable base 141 by the magnetic fixing means. At this time, the article fixing magnet 147A and the permanent magnet 111A of the container fixing member 111 draw to each other so as to substantially align the centers of the magnets to each other. As a result, the container fixing member 111 is roughly positioned in self-aligned fashion about the positioning center on the movable base 141. Accordingly, the container fixing member 111 cooperates with movable base 141 by positioning pin 147B of the magnetic cooperation means after being roughly positioned on the movable base 141 in self-aligned fashion by the magnetic fixing means. Namely, since, in advance of cooperating operation by the positioning pin 147B, the container fixing member 111 is roughly positioned on the movable base 141 by the magnetic fixing means, the positioning operation can be made simple and easy.

In addition, the movable base 141 has a permanent magnet 148 at the inner end for magnetically drawing the permanent magnet 111A of the container fixing member 111.

The left and right stationary bases 142 have second positioning pins 142C received in recesses 142B. Permanent magnets 142D are provided at the lower ends of the respective second positioning pins 142C. On the other hand, each of the left and right magnet supporting portions 141C provided on the movable base 141 is provided with three pin drive magnets 149A, 149B and 149C formed with permanent magnets. The pin drive magnetic 149A and 149C are adapted to oppose the permanent magnet 142D of the second positioning pin 142C to apply a magnetic drawing force to the permanent magnet 142D when the movable base 141 is set at the outer and inner end positions. By the magnetic drawing force, the second positioning pin 142C is retracted within the recess 142B. On the other hand, the pin drive magnet 149B is adapted to oppose the permanent magnet 142D of the second positioning pin 142C to apply the magnetic repulsive force to the permanent magnet 142D so that the second positioning pin 142C is projected out of the recess when the movable base 141 is positioned at the intermediate position between the outer and inner end positions. As will be discussed later, the second positioning pin 142C as projected from the recess engages the second positioning hole 111C of the container fixing member 111. It should be appreciated that the permanent magnet 142D of the second positioning pin 142C and the pin drive magnets 149A and 149C oppose opposite poles (s pole and N pole) at opposing positions to generate the magnetic drawing force as set forth above. On the other hand, the permanent magnet 142D of the second positioning pin 142C and the pin drive magnet 149B oppose the same pole as opposed to each other so as to generate the magnetic repulsive force.

The empty container infeed starwheel 112 and the first intermediate starwheel 114 respectively have article transferring and holding devices which have substantially the same construction. The article transferring and holding device 150 of the first intermediate starwheel 114 will be discussed below as an example.

The article transferring and holding device 150 has an article drawing magnet 151 arranged on the notched outer periphery of the first intermediate starwheel 114. The recessed portion of the article drawing magnet 151 is engageable with the inner end of the movable base 141 which forms the article transferring and holding device 140 of the filling starwheel 113. Here, the magnetic force of the article drawing magnet 151 is set to be greater than the magnetic force of the permanent magnet 148 of the movable base 141.

(A-1) The container fixing member 111 is transferred from the empty container starwheel 112 to the filling starwheel 113 and held by the filling starwheel 113 by the article transporting and holding device 140. (see FIG. 15 )

When the filling head 113D of the filling starwheel 113 is positioned at a transferring position (A) where the empty container infeed starwheel 112 and the filling starwheel 113 are approached by each other, the movable base 141 is set at the outer end position. Then, the outer end of the movable base 141 engages with the recessed portion of the article drawing magnet provided on the notched outer periphery of the empty container infeed starwheel 112. At this time, the empty container infeed starwheel 112 draws the permanent magnet 111A of the container fixing member 111 on the article drawing magnet to hold the container fixing member. However, the positioning device 147 of the movable base 141 maintains the first positioning pin 147B in the retracted position and draws the permanent magnet 111A of the container fixing member 111 on the empty container infeed starwheel 112 to catch the container fixing member by the ring-shaped article drawing magnet 147A. By this, the permanent magnet 111A of the container fixing member 111 is drawn by both the article drawing magnet 147A and the article drawing magnet of the empty container infeed starwheel 112. However, since the magnetic force of the article drawing magnet 147A is designed to have a greater magnetic force than that of the article drawing magnet of the empty container infeed starwheel 112, the container fixing member 111 is transferred from the empty container infeed starwheel 112 to the filling starwheel 113 without causing displacement due to vibration.

When the filling head 113D of the filing starwheel 113 reaches the filling operation start position (B) from the above-mentioned transferring position (A), the movable base 141 is placed at the inner end position. At this time, the positioning device 147 of the movable base 141 projects the first positioning pin 147B so that the first positioning pin 147B may engage with the first positioning hole 111B of the container fixing member 111 to complete the positioning of the container fixing member 111. Then, the container fixing member 111 is held on the movable base 141. By this, the permanent magnet 111A of the container fixing member 111 is drawn by the article drawing magnet 147A and held when the filling starwheel 113 is rotated. Also, the container fixing member 111 is positioned by the first positioning pin 147B to move along the filling process path 113C.

Figure 15:
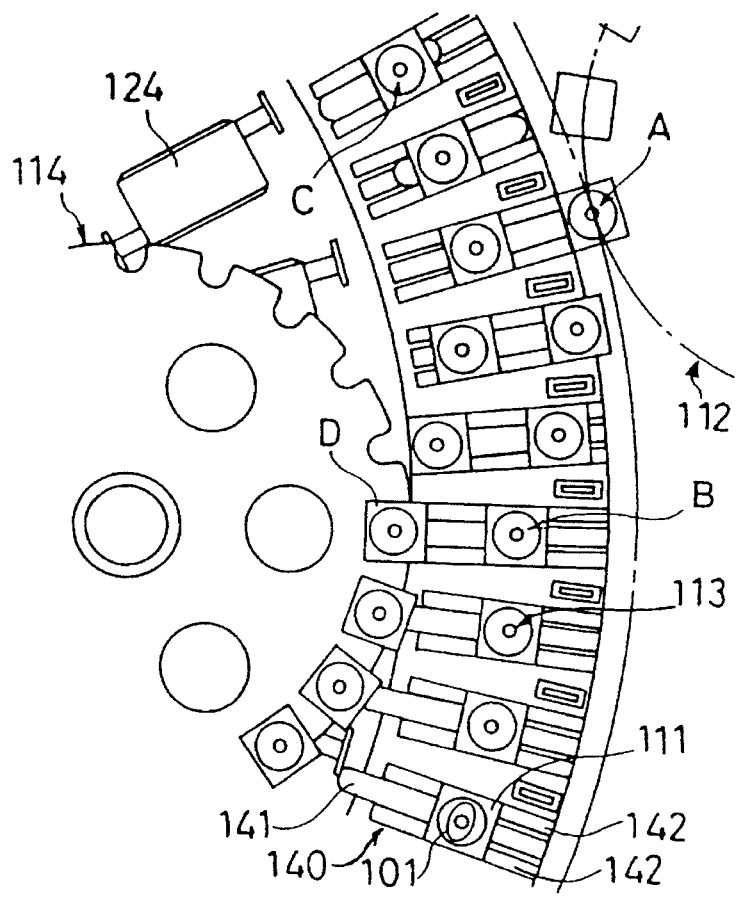
FIG. 15 is an illustration showing a container transferring and holding apparatus provided in the filling starwheel.
Figure 16:
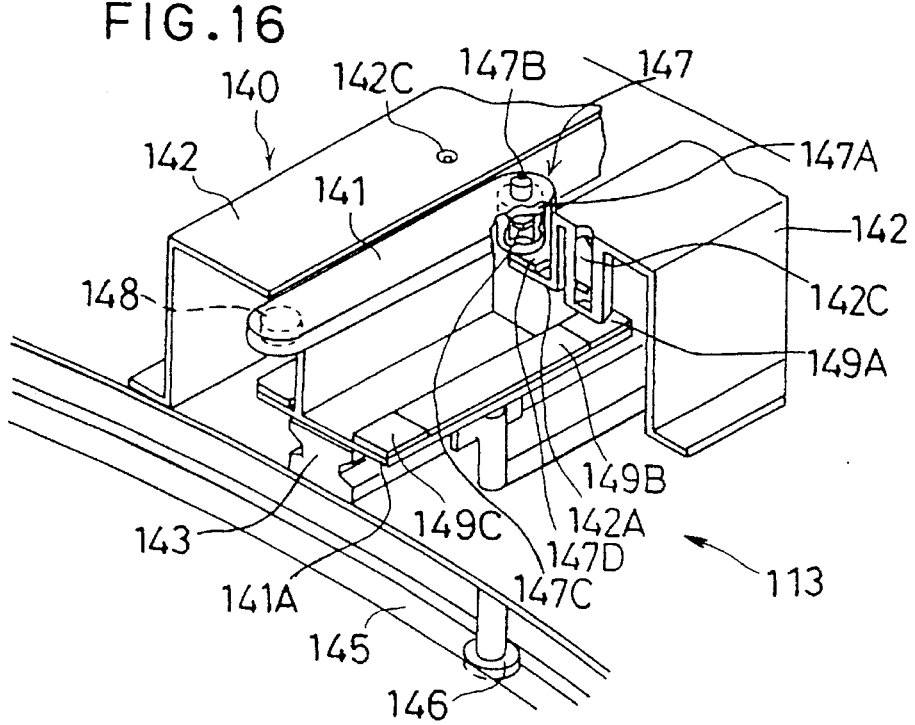
FIG. 16 is a perspective view showing the container transferring and holding apparatus, which is illustrated in partially cut out form.
Figure 17:
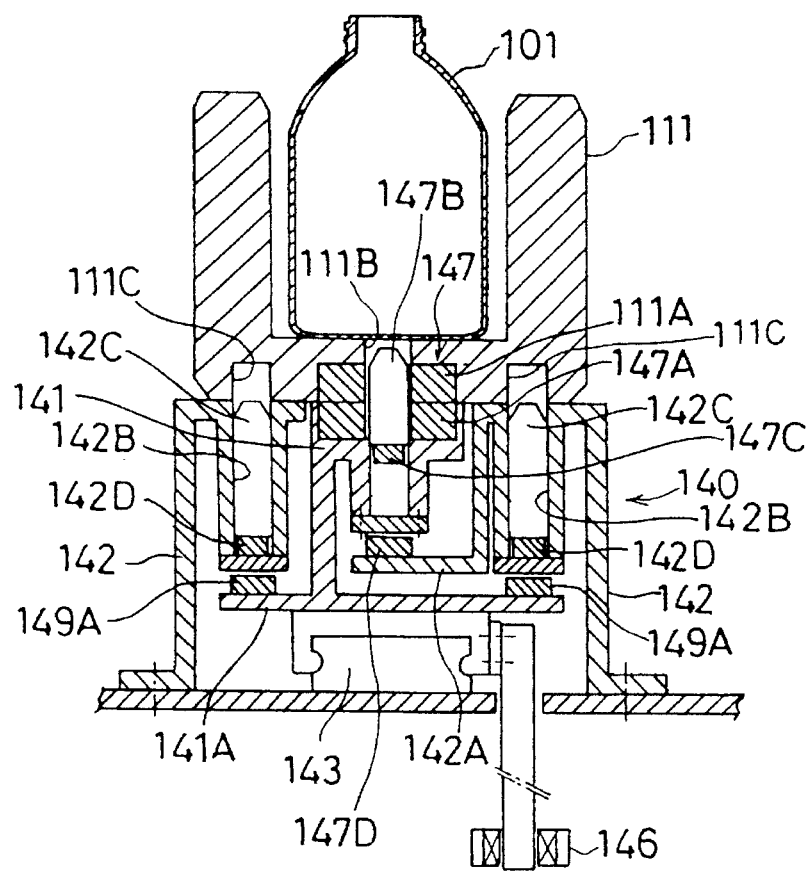
FIG. 17 is a section of the container transferring and holding apparatus.

(A-2) Next, the container fixing member 111 is transferred from the filing starwheel 113 to the first intermediate starwheel 114 by the article transferring and holding device 140 (see FIG. 15)

When the filling head 113D of the filing starwheel 113 passes across the filling operation end position (C), the movable base 141 shifts from the inner end position to the outer end position. At this time, the second positioning pins 142C of the stationary base 142 project to engage with two positioning holes 111C of the container fixing member 111 to hold the container fixing member. On the other hand, the positioning device 147 of the movable base 141 retracts the first positioning pin 147B so as to release engagement between the first positioning pin 147B and the first positioning hole 111B of the containing fixing member 111. By this, the movable base 141 shifts to the outer end position leaving the container fixing member 111 on the stationary base 142. From this position, the above-mentioned operation (A-1) is restarted to drawing and catching the new container fixing member 111 by the article drawing magnet 147A of the positioning device 147.

The container fixing member 111 past across the filling process path 113C and left on the stationary base 142 by engagement of the second positioning pins 142C and the second positioning holes 111C, is drawn and held by the permanent magnet 148 of the movable base 141 when the movable base 141 reaches the outer end position. When the movable base 141 moves from the outer end position to the inner end position to return, the second positioning pins 142C engaging with the second positioning holes 111C of the container fixing member 111 are retracted. Then, the container fixing member 111 is moved to a transporting position (D) at which the filling starwheel 113 and the first intermediate starwheel 114 approach each other in the condition where it is drawn and held by the permanent magnet 148 of the movable base 141. (see FIGS. 12 and 15)

At the transferring position (D), the inner end of the movable base 141 engages with the recessed portion of the article drawing magnet 151 provided on the notched outer peripheral portion of the first intermediate starwheel 114. By this, the permanent magnet 111A of the container fixing member 111 is drawn by both time permanent magnet 148 and the article drawing magnet 151 of the first intermediate starwheel 114, simultaneously. However, since the article drawing magnet 151 is designed to have a greater magnetic force than that of the permanent magnet 148, the containing fixing member 111 can be transferred from the filing starwheel 113 to the first intermediate starwheel 114 without causing displacement due to vibration.

(A-3) Next, the container fixing member 111 is held on the first intermediate starwheel 114 by the article transferring and holding device 150 in the following manner. (see FIG. 12)

When the first intermediate starwheel 114 is rotated, the permanent magnet 111A of the container fixing member 111 is drawn and held by the article drawing magnet 151 of the first intermediate starwheel 114.

Figure 13:
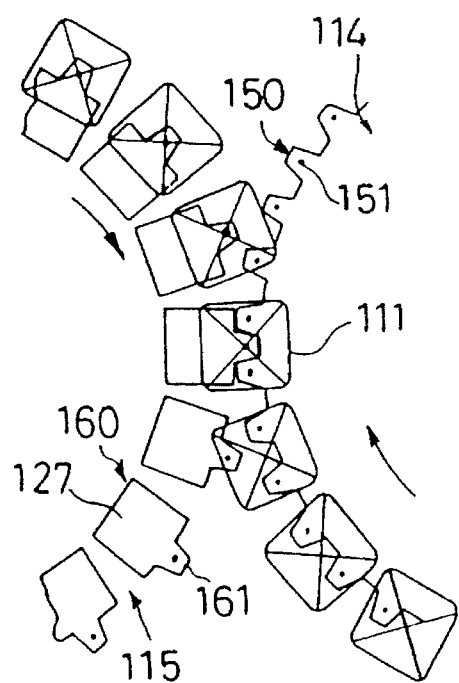
FIG. 13 is an illustration showing a container transferring condition between the first intermediate starwheel and a capping starwheel.
Figure 14A:
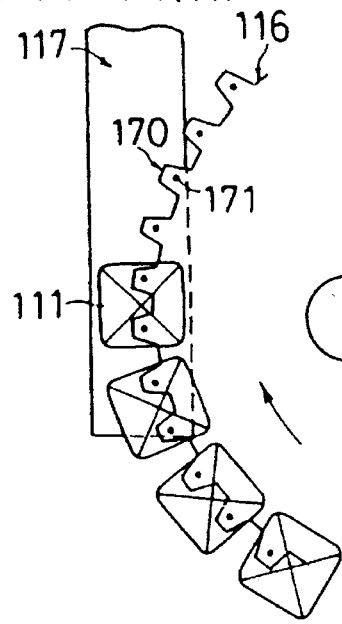
FIG. 14 is an illustration showing a container transferring condition between a second intermediate starwheel and a discharge conveyer.
Figure 14B:
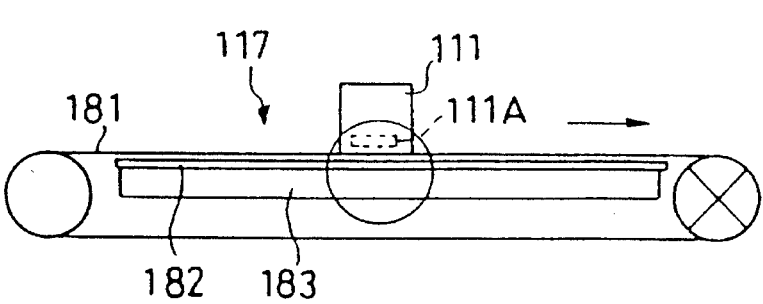

(B) Transferring from First Intermediate starwheel 114 to Capping starwheel 115, Holding on the Capping starwheel 115, Transferring from the Capping starwheel 115 to the Second Intermediate starwheel 116 and Holding on the Second Intermediate starwheel 116 (see FIGS. 13 and 14)

A transferring and holding device 160 of the capping starwheel 115 has an article drawing magnet 161 on the supporting plate 127 of each capping head 115D, as shown in FIG. 13. The supporting plate 127 is designed to be engageable with a recess of the article drawing magnet 151 provided on the notched outer periphery of the first intermediate starwheel 114. Here, the article drawing magnet 161 is provided with a magnetic force greater than that of the article drawing magnet 151.

An article transferring and holding apparatus 170 of the second intermediate starwheel 116 has an article drawing magnet 161 on the notched outer periphery of the second intermediate starwheel 116, as shown in FIG. 14. The recessed portion of the article drawing magnet 171 is engageable with the support plate 127 of the capping starwheel 115. Here, the article drawing magnet 171 is provided with a greater magnetic force than that of the article drawing magnet 161 of the supporting plate 127.

(B-1) Therefore, the container fixing member 111 is transferred from the first intermediate starwheel 114 to the cap starwheel 115 by the article transferring and holding apparatus 150 and 160, and held in the capping starwheel 115. (see FIG. 13).

At the transferring position where the first intermediate starwheel 114 and the capping starwheel 115 approach to each other, the recessed portion of the article drawing magnet 151 of the first intermediate starwheel 114 and the support plate 127 of the capping starwheel 115 are engaged to each other. By this, the permanent magnet 111A of the container fixing member 111 is draw by both of the article drawing magnet 151 and the article drawing magnet 161 of the support plate 127 simultaneously. However, since the magnetic force of the article drawing magnet 161 is greater than that of the article drawing magnet 151, the container fixing member 111 is transferred from the first intermediate starwheel 114 to the capping starwheel 115 without causing displacement due to vibration.

When the cap starwheel 115 is rotated, the permanent magnet 111A of the container fixing member 111 is drawn and held by the article drawing magnet 127 of the support plate 127. At this condition, the container fixing member 111 moves along the capping process path 115C.

(B-2) Next, the container fixing member 111 is transferred from the capping starwheel 115 to the second intermediate starwheel 116 by the article transferring and holding apparatus 160 and 170, and held on the second intermediate starwheel 116.

At the transferring position where the capping starwheel 115 and the second intermediate starwheel 116 approach each other, the support plate 127 of the capping starwheel 115 and the recessed portion of the article drawing magnet 171 of the second intermediate starwheel 116 are engaged with each other. By this, the permanent magnet 111A of the container fixing member 111 is drawn by both the article drawing magnet 161 if the supporting plate 127 and the article drawing magnet 171 of the second intermediate starwheel 116 simultaneously. Since the article drawing magnet 171 is provided with a greater magnetic force than that of the article drawing magnet 161, the container fixing member 111 is transferred from the capping starwheel 115 to the second intermediate starwheel 116 without causing displacement due to vibration.

While the second intermediate starwheel 116 is rotated, the permanent magnet 111A of the container fixing member 111 is drawn and held by the article drawing magnet 171 of the second intermediate starwheel 116.

(C) Transferring from Second Intermediate starwheel 116 to the Discharge conveyer 117 and Holding in the Discharge conveyer 117 (see FIG. 14)

The discharge conveyer 117 is designed to mount the container fixing member 111 on a transporting belt 181 which travels a given transporting path, for transportation, as shown in FIG. 14. The discharge conveyer 117 is arranged on an article guiding magnet 183 via a non-magnetic belt receptacle 182 on the lower position along the article transporting path by the transporting belt 181. The article guiding magnet 183 can be placed with a magnetic body, such as an iron plate. Then, the discharge conveyer 117 is arranged to overlap the upstream end of the transporting belt 181 with the notched outer peripheral portion of the second intermediate starwheel 116 to define the transferring position between the second intermediate starwheel 116 and the discharge conveyer 117 at this overlapping position. Here, the article guiding magnet 183 is provided greater magnetic force than that of the article drawing magnet 151 of the second intermediate starwheel 116.

Therefore, the transferring position where the second intermediate starwheel 116 and the discharge conveyer 117 overlap, the permanent magnet 111A of the container fixing member 111 is drawn both of the article drawing magnet 171 of the second intermediate starwheel 116 and the article guiding magnet 183 of the discharge conveyer 117. However, since the magnetic force of the article guiding magnet 183 is greater than that of the article drawing magnet 151 of the second intermediate starwheel 116, the container fixing member 111 is transferred to the discharge conveyer 117 without causing displacement due to vibration.

When the discharge conveyer 117 travels, the container fixing member 111 is transported with the transporting belt 181 with the permanent magnet 111A thereof drawn on the article guiding magnet 183.

It should be noted that the second positioning pin 142C provided on the stationary base 142 of the article transferring and holding device 140 can be designed so as not to be driven by the pin drive magnets 149A~149C, and is driven by contacting a cam follower 301 onto a cam 302 provided on the outer peripheral frame 144 of the filling apparatus 110 to engage and release the engagement with the second positioning holes 111C of the container fixing member 111.

Next, the effects and advantages of the present embodiment will be discussed.

① Respective of the process path of the filling process path 113C and the capping process path 115C are provided with a plurality of filling heads 113D and the capping heads 115D. Therefore, high productive performance in the filling process and capping process can be obtained.

Respective process paths 113C and 115C are formed into the annular configuration with a plurality of filling heads 113D and 115D and arranged in the relationship that one is arranged inside of the other. Therefore, the installation space of the overall construction of the filling apparatus may be reduced.

② When the container fixing member 111 is transferred through respective starwheels 112~116 and the discharge conveyer 117, the container fixing member 111 is held magnetically by the article transferring and holding devices 140, 150, 160 and 170, and transferred in a position held by the magnetic force, the container fixing member 111 and the container 101 can be transferred in the stable attitude without causing displacement due to vibration, with simple construction.

③ Since the positioning device 147 is provided in the filling process path 113C of the filling starwheel 113, the container fixing member 111 and the container 101 can be accurately positioned with respect to the filling device 125 of the filing head 113D with simple construction.

It is possible that instead of employing the container fixing member 111, a magnet or magnetic body can be contained in the container 101 per se so that each article transferring and holding device 140, 150, 160 and 170 holds this magnet or the magnetic body.

Also, the magnet provided in the article transferring and holding device 140, 150, 160 and 170 can be an electromagnet.

Modification of the present invention will now be discussed below.

(1) Transporting Direction FIG. 18(A)–(C)

The filling process path 191 and the other process path 192 can be in reverse directions as shown in FIG. 18(A), 18(C) and can be in the same direction as shown in FIG. 18(B).

(2) Multi-level Path FIG. 19(A)–(B)

The filling process path 191 and other process paths 192A~192C . . . can be arranged on a common plane as shown in FIG. 19(A), or can be in a vertical two level arrangement as shown in FIG. 19(B).

Figure 20A:
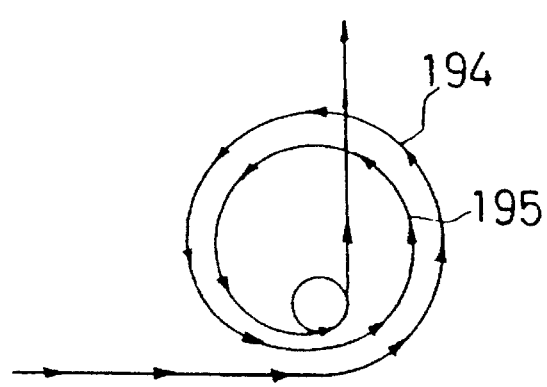
FIGS. 20(A)–(B) are illustrations showing further modifications of the present invention.
Figure 20B:
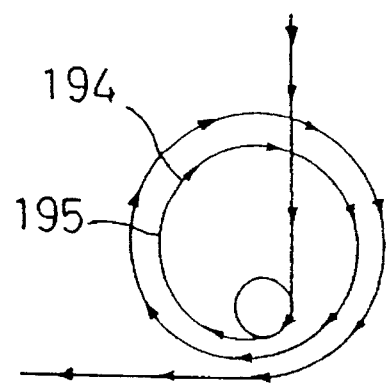

(3) Order of Paths FIG. 20(A)–(B)

Depending upon the content of the other processes, the filling process path 191 can be arranged at the upstream side of the other process path 192, or, in the alternative, at the downstream side. In the further alternative, the filling process path 191 can be arranged at the intermediate position between two other process paths 192. At this time, the path 194 of the leading process can be arranged outside the path 195 of the following process as shown in FIG. 20(A), or, in the alternative, inside of the latter as shown in FIG. 20(B).

(4) Path Pattern FIG. 21 (A)–(D)

Figure 21A:
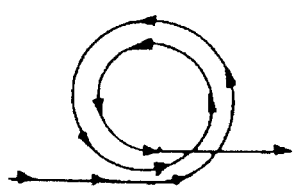
FIGS. 21 (A)–(D) are illustrations showing still further modifications of the present invention.
Figure 21B:
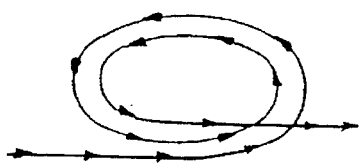
Figure 21C:
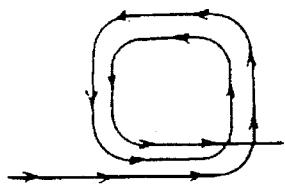
Figure 21D:
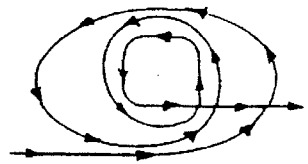
Figure 22:
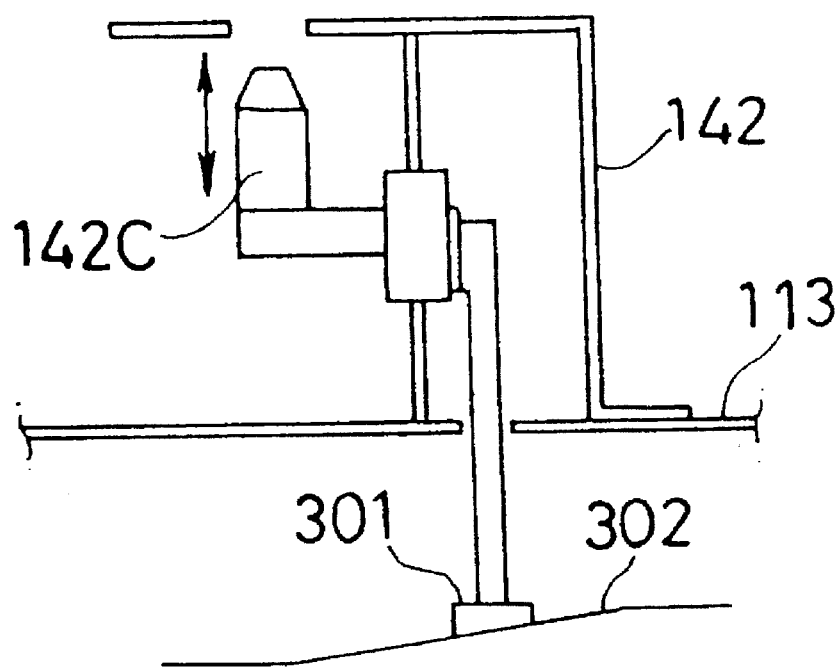
FIG. 22 is an illustration of a yet further modification of the invention.

The patterns of the filling process path 191 and the other process path 192 can be a circular annular configuration as shown in FIG. 21(A), an elliptic annular configuration as shown in FIG. 21(B), a quadrangular annular configuration as shown in FIG. 21(C), a composite configuration 6f the circular annular, elliptic annular and quadrangular configurations as shown in FIG. 21(D), or any other configuration.

Figure 23:
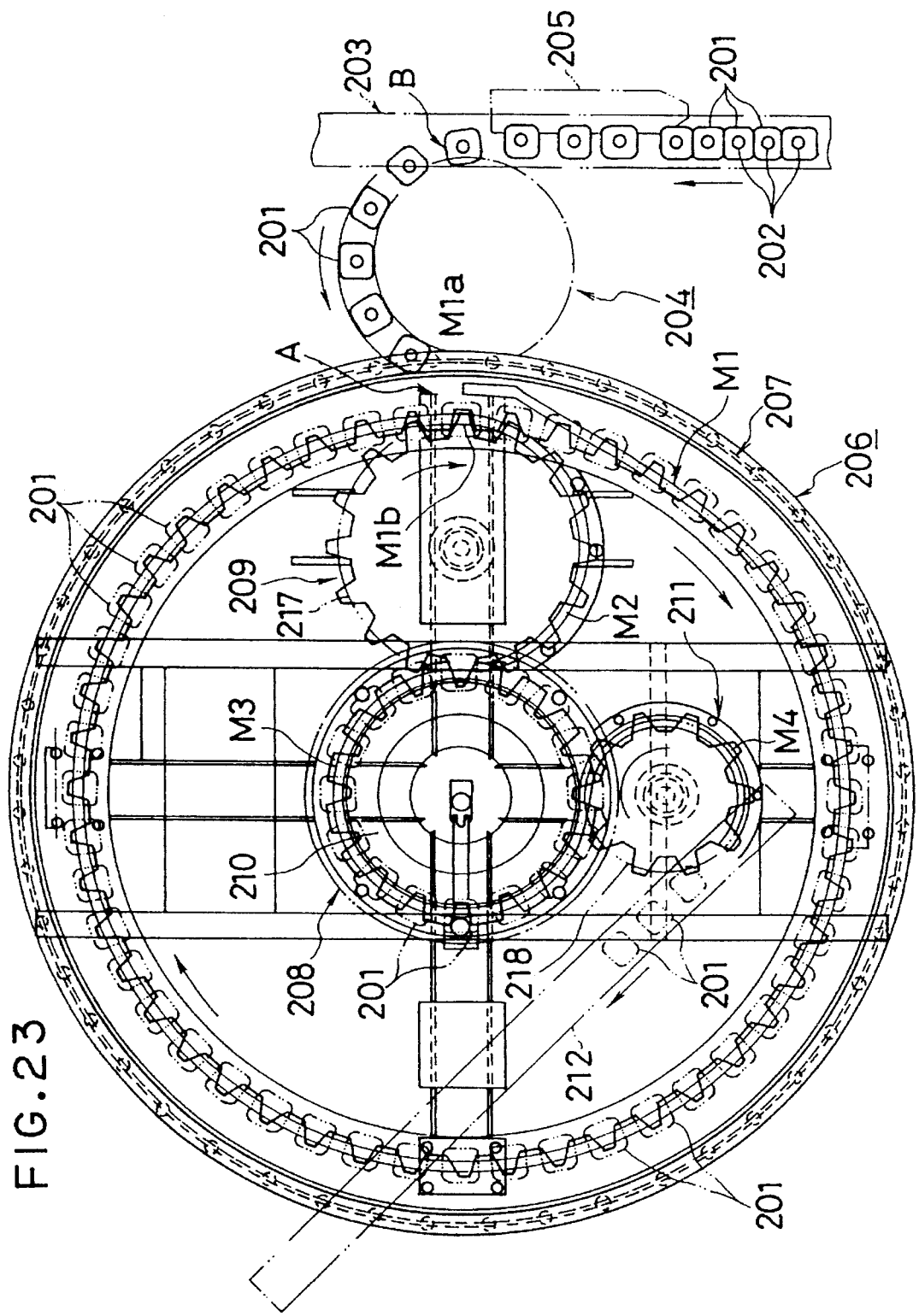
FIG. 23 is a fragmentary plan view of one embodiment of the present invention.
Figure 24:
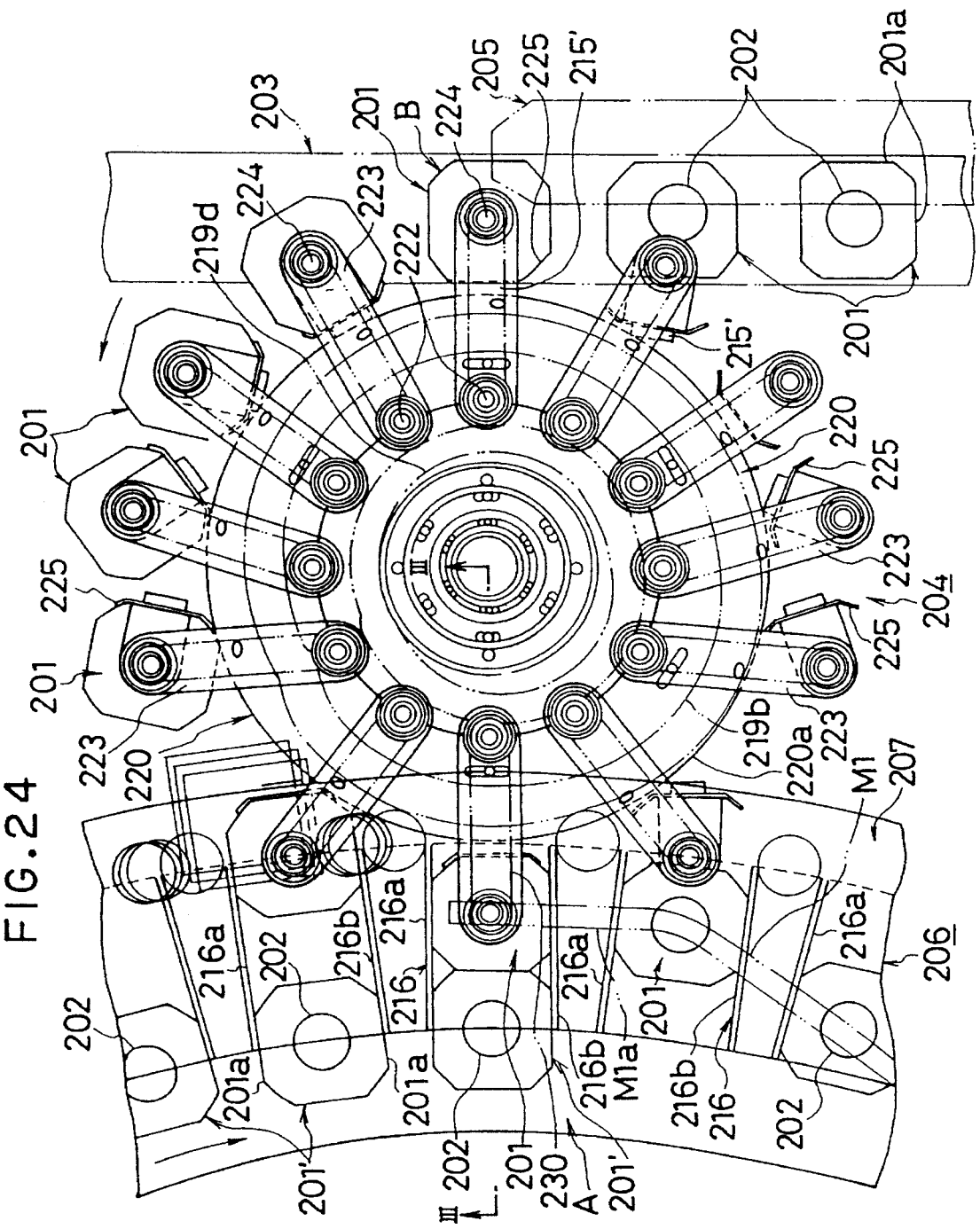
FIG. 24 is an enlarged view showing the detailed construction of FIG. 23.
Figure 25:
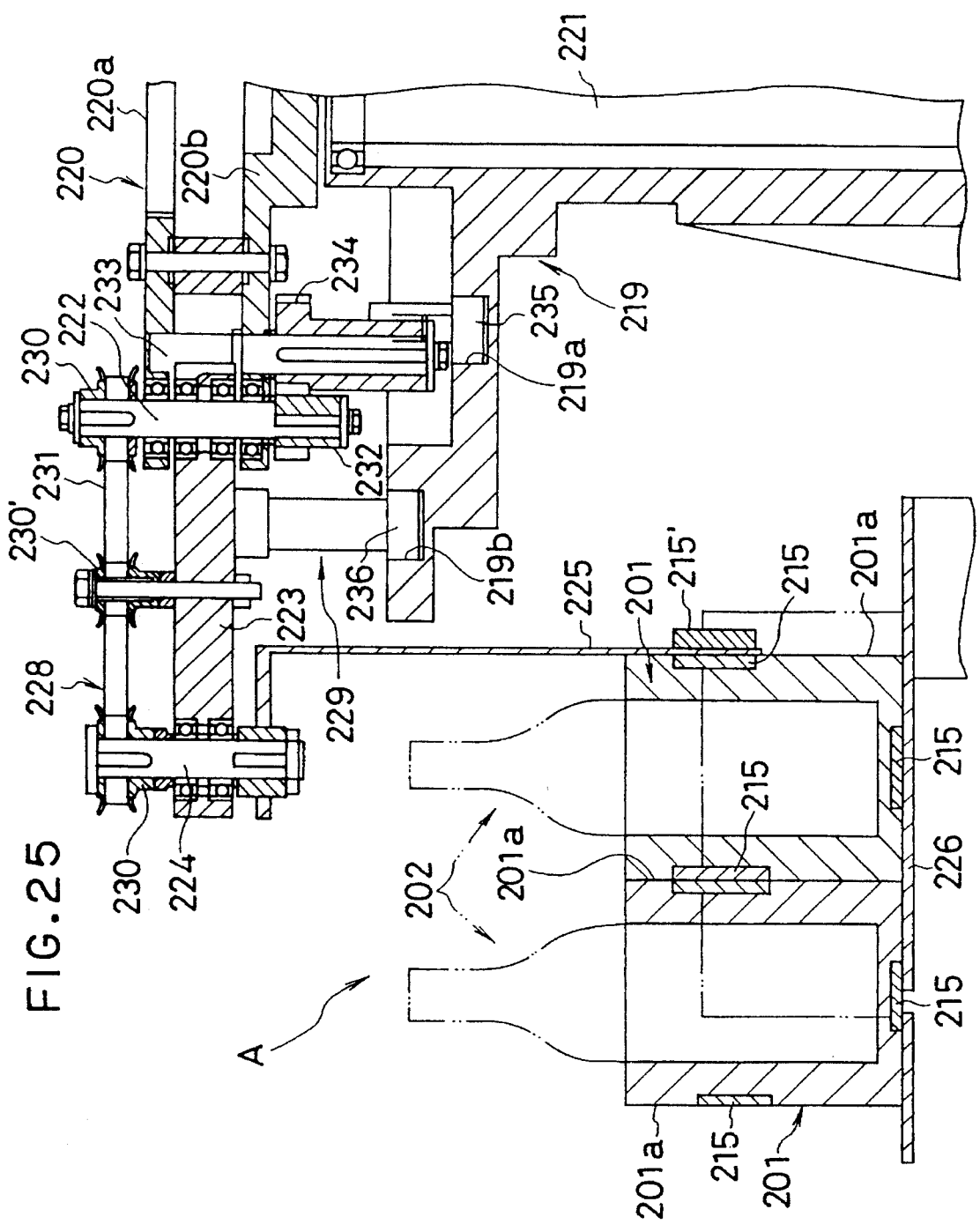
FIG. 25 is a section taken along line III—III of FIG. 24.

(THIRD EMBODIMENT) (see FIGS. 23–25)

In FIG. 23, an empty container 202 received in a holder 201 is designed to be transported from an upstream side to a transferring position 204 by a transporting conveyer 203. The holders 201 transported on the transporting conveyer 203 are spaced apart from each other by engaging with a timing screw 205.

The holders 201 provide the given intervals by the timing screw 205 are picked from the transporting conveyer 203 by a transferring device 204. Then, the holders 201 are transferred to a rotary table 207 of a rotary filling apparatus 206 at a transferring position A.

At the position above the rotary table 207 mounting each holder 201, a not shown filling nozzle which is rotatable with the rotary table in integral fashion is provided. While the rotary table 207 is rotated over one cycle in the clockwise direction, the container 202 in the holder 201 can be filled with a filling liquid by the filling nozzle.

A rotary capper 208 for setting a cap on the upper end of the container 202 is provided on the inner side of the rotary filling apparatus 206. The container 202, for which filling operation by the rotary filling apparatus 206 is completed, is transferred from the rotary table 207 of a rotary table 210 of the rotary capper 208 by a first transferring mechanism 209 which is provided inside of the transferring position A.

The rotary capper 208 includes a plurality of capping heads (not shown) above the rotary table 210. While the rotary table 210 is driven in the counterclockwise direction, the cap is set on the upper end of the container 202 by the capping head.

The container 202 in the holder 201, for which setting of the cap by the rotary capper 208 is completed, is ejected to a discharge conveyer 212 by a second transferring mechanism 211 provided adjacent the rotary capper 208.

As shown in FIGS. 24 and 25, the holder 201 of the present embodiment receiving the container 202 is formed into a bottomed cylindrical configuration and provided a parallelpiped outer circumferential configuration. As shown in FIG. 25, flat surfaces 201a at four portion on the outer circumferential portion and the bottom have plate form magnets 215 buried therein. The magnetic poles of these magnets 215 are the same as that on the surface of the holder 201. By burying the magnet 215 in the holder 201, transportation and transferring by the transferring device 204 of the holder 201 can be facilitated. Also, by chamfering all four corners of the outer peripheral portion of the holder 201, transferring of the holder 201 at the transferring position A can be facilitated.

As shown in FIGS. 23 and 24, the rotary table 207 of the rotary filling apparatus 206 is formed with an annular plate member. Guide members 216 for radially guiding the holders 201 are provided on the upper surface of the rotary table 207 with circumferential regular intervals. The filling nozzles (not shown) are provided above the respective guide members 216.

Each guide member 216 comprises mutually parallel plate members 216a and 216b. These are fixed on the upper surface of the rotary table 207 in radially oriented positions. While each of the guide member 216 on the rotary table 207 travels across the transferring position A in the clockwise direction, the holders 201 are pushed for insertion from the radially outside by the transferring device 204 for transferring.

The holder 201 thus transferred to the guide member 216 at the transferring position A is grasped by both plate members 216a and 216b at the front and rear faces of the outer periphery thereof. Accordingly, each holder 201 can be accurately positioned at the circumferential position on the rotary table 207. On the other hand, the holder 201 is held movable in the radial direction by both plate members 216a and 216b.

As shown in FIG. 23, at a position of the rotary filling apparatus 206 in the vicinity of and below the rotary table 207, strip form magnets M1 are fixed along the transporting paths of the respective guide members 216. The tip end portion M1a and the trailing end M1b of the magnet M1 are overlapped in the circumferential direction at the transferring position A. The guide member 216 provided on the rotary table 207 extends substantially in perpendicular to the magnet M1. Accordingly, the holder 201 transferred to the guide member 216 at the transferring position A is transported in the position drawn by the magnet M1. By drawing the holder 201 in the guide member 216 by the magnet M1, the holder 201 can be positioned at the predetermined radial position on the rotary table 207.

As set forth above, the holder 201 is restricted at the front and rear face relative to the transporting direction by the plate members 216a and 216b of the guide member 216, and drawn by the magnet M1. Therefore, the container 202 in the holder 201 transferred to the rotary table 207 can be accurately positioned in the circumferential and radial directions.

The trailing end M1b of the magnet M1 is connected to an arc shaped magnet M2 provided at the lower position of the rotary table 207 of the first transferring mechanism 209. The magnet M2 is connected to an arc shaped magnet M3 provided at the lower position of the rotary table 210 of the rotary capper 208. The magnet M3 is connected to an arc shaped magnet M4 provided at the lower position of a rotary table 218 of the second transferring mechanism 211. The end of the magnet M4 is positioned overlapping with the end of the discharge conveyer 212. It should be noted that the magnets M1~M4 are provided with different poles than the magnetic pole of the magnet 215 buried in the holder 201.

With the foregoing construction, from the transferring position A in the rotary filling apparatus 206 to the feeding conveyer 212 via the rotary capper 208, the magnets M1~M4 are provided sequentially. Therefore, the holder 201 transferred at the transferring position A can be transported through these magnets M1~M4 in the position drawn by them. By this, loosening of the holder from respective of the rotary tables 207, 217, 210 and 218 during transportation can be successfully prevented. Also, with these magnets M1~M4, the radial position of the holder 201 can be accurately maintained. Furthermore, in the present embodiment, since the discharge conveyer 212 comprises a magnetic conveyer, the holder 201 will never slip out from the discharge conveyer 212.

Next, construction of the transferring device 204 will be discussed with reference to FIGS. 24 and 25. The transferring device 204 has a support frame 219. The support frame 219 is provided with a rotary body 220 which is rotatable.

The rotary body 220 is designed for rotation in synchronism with the rotary table 207 of the rotary filling apparatus 206. The rotary body 220 includes a vertical shaft 221 rotatably provided on the support frame 219 and upper and lower two discs 220a and 220b mounted at the upper end of the vertical shaft 221. rotary shafts 222 are provided with circumferential regular intervals on both disks 220a and 220b. Upper and lower ends of each rotary shaft 222 extend through both discs 220a and 220b. On the outer peripheral portion of the rotary shaft 222 positioned between the discs 220a and 220b, an arm 223 is pivotally mounted.

On the tip end of each arm 223, a rotary shaft 224 is extended vertically in rotatable fashion. On the lower end of each rotary shaft 224 extending through the arm 223, a plate form holding member 225 is connected with a bracket.

As shown in FIG. 24, the cross-sectional configuration of the holding member 225 is conformed with the one planar surface 201a of the holder 201 and both corners thereof. As shown in FIG. 25, the lower reverse surface of the holding member 225 engaging with the planar surface 201a of the holder 201 has a magnet 215' having an opposite polarity to that of the magnet 215 buried in the holder 201. Accordingly, by engaging the holding member 225 onto the outer periphery of the holder 201 on the discharge conveyer 203, the holder can be drawn and held by the magnet 215' provided on the holding member 225.

The holding member 225 is rotatable about the rotary shaft 224 by a rotating mechanism 228 cooperating with the rotary body 220. On the other hand, the arm 223 mounted on the holding member 225 may pivot or swing in the forward and reverse directions by a swing mechanism 229 cooperating with the rotary body 220. By the operation of the rotary mechanism 228 and the swing mechanism 229 in cooperation with the rotary body 220, the arm 223 is driven to swing and the holding member 225 is rotated at the respective rotational section of the rotary body 220. By this, the holder 201 is picked from the transportation conveyer 203 and supplied to the transferring position A by the holding members 225. As shown in FIG. 25, below the path of the motion of each holding member 225, an annular mounting base 226 is fixedly provided. The fixed base 226 supports the bottom of the holder 201 held by each holding member 225.

The rotary mechanism 228 includes belt wheels 230 respectively mounted on the upper ends of both rotary shafts 222 and 224, and a timing belt 231 extend between the belt wheels in endless fashion. On the upper surface of the arm 223 which is positioned at the intermediate position between both belt wheels 230, a belt wheel 230' is provided to engage the timing belt 231 and thus maintain the tension of the latter. A gear 232 is mounted on the lower end of the rotary shaft 222. The gear 232 is meshed with a gear 234 at the side of the rotary shaft 233 rotatably provided on the rotary body 220. A cam follower 235 is mounted on the lower position of the gear 234 via a bracket directed in the radial direction. The cam follower 235 engages with a cam groove 219a sequentially extending in the circumferential direction of the upper surface of the support frame 219.

Accordingly, associated with counterclockwise rotation of the rotary body 220, the cam follower 235 travels along the cam profile of the cam groove 219a so that the holding member 225 is driven in the forward and reverse directions about the rotary shaft 224 via the gears 232 and 234 and the timing belt 231.

On the other hand, the swing mechanism 229 includes a cam follower 236 mounted via a bracket which is fixed at the lower central portion of the arm 223. The cam follower 236 engages with a second cam groove 219b sequentially extending in the circumferential direction on the upper surface of the support frame 219.

By this, the cam follower 236 travels along the cam profile of the cam groove 219b according to the rotation of the rotary body 220 so that the arm 223 can be driven to swing in the forward and reverse directions about the rotary shaft 222.

In the shown embodiment, the cam profiles of the cam grooves 219a and 219b are designed to swing the arm 223 and rotate the holding member 225 at a respective section of rotation of the rotary body 220.

Namely, at the engaging position B where the holding member 225 engages the holder 201 on the transporting conveyer 203, the arm 223 is directed in the radial direction relative to the rotary body 220 and extends perpendicular to the transporting conveyer 203. On the other hand, at this position, the holding member 225 is situated in a position perpendicularly intersecting with the arm 223. At this time, the rotary shaft 224 connected to the holding member 225 is positioned immediately above the center (center of the container) of the holder 201 on the transporting conveyer 203. At the engaging position B, the holding member 225 engages the side surface of the holder 201 on the transporting conveyer 203 to draw and hold the holder 201.

The holding member holding the holder 201 at the engaging position B picks the holder from the transporting conveyer 203 and moves gradually toward the transferring position A according to counterclockwise rotation of the rotary body 220. During travel of the holding member from the engaging position B to the transferring position A, the arm 223 is slightly swung in the clockwise direction above the rotary shaft 222. On the other hand, the holding member 225 holding the holder 201 is rotated about the rotary shaft 224 so that it can be directed consistent with the radial direction of the rotary filling apparatus 206.

Then, when the holding member 225 reaches the transferring start position at the transferring position A, a part of the holder 201 is pushed into the guide member 216 of the rotary table 207 rotating in the clockwise direction from the radially outer side.

Subsequently, associated with the rotation of the rotary table 207 and the rotary body 220, the holding member 225 shifts up to the central position. The holder 201 held in the holding member 225 is urged toward the radially inside along both plate member 216a and 216b forming the guide member 216 and thus to be transferred to the guide member 216.

As set forth above, at the center position of the transferring position, the arm 233 becomes parallel to both plate members 216a and 216b forming the guide member. On the other hand, the holding member holding the new holder perpendicularly intersects with the arm 233.

On the other hand, the new holder 201 inserted into the guide member 216 at the transferring position A, is moved in the clockwise direction in the transferring direction by the magnet M1. The magnetic force of the magnet M1 is greater than that of the holding member 225 holding the holder 201. Therefore, when the guide member 216 and the holding member 225 completely pass across the transferring position A, the holder 201 in the guide member 216 is separated from the holding member 225. Therefore, transferring operation at the transferring position A is completed.

In the shown embodiment, with respect to the guide member 216 passing across the transferring position A, the respective holding members 225 are moved across the transferring position in synchronism therewith. Also, the transferring position A is set at the position where the holding member 225 is oriented to be perpendicular to the guide member 216. By this, transferring of the holder 201 at the transferring position A can be smoothly performed.

As set forth, in the present embodiment, the holders 201 are transferred to the respective guide members 216 on the rotary table 207 in order by means of the holding member 225 at the transferring position A.

The arm 223 and the holding member 225 past the transferring position A return to the engaging position B on the transporting conveyer 203 through the opposite action to those in the action from the engaging position B to the transferring position A.

As set forth above, according to the construction of the shown embodiment, the holder 201 transferred to the guide member 216 on the rotary table 207 is engaged in the circumferential direction on the rotary table 207 by engaging with the guide member 216 and in the radial direction on the rotary table 207 by drawing force of the magnet M1. By this, the container 202 held in the holder 201 can be accurately positioned on the rotary table 207.

In addition, even when the holder 201 is held by the guide member 216 on the rotary table 207, it can be moved toward radially inward of the rotary table 207 along the guide member 216. Accordingly, even when the rotary capper 208 is provided radially inside of the rotary filling apparatus 206 as in the present embodiment, the embodiment may be adapted. Therefore, in comparison with the conventional apparatus which cannot feed out the holder 201 in the radially inward direction from the guide member 216, the present invention can provide significantly higher applicability.

As set forth above, according to the present invention, upon connection of the supply portion and feeding out portion to an annular process path for the articles, the effective range of the process path can be expanded so that the effective process path length can be increased without increasing the size of the facility.

On the other hand, according to the present invention, high production performance in filling and other processes can be obtained with reducing installation space of the overall construction of the filling apparatus.

Furthermore, according to the present invention, in positioning the article on the supporting base, accurate positioning can be achieved with simple operation and construction of the devices.

In addition, according to the present invention, it is possible to accurately position the articles transferred to the secondary rotary body and the article processing apparatus.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the feature set out in the appended claims.

What is claimed is:

1. An article positioning apparatus for positioning an article on a supporting base, comprising:

a magnetic drawing means including a magnet provided around a positioning center of said supporting base and a magnet mounted on said article side for magnetically drawing said article onto said supporting base; and a magnetic coupling means for coupling said supporting base and said articles by means of a positioning pin driven by a magnetic drawing force or a magnetic repulsing force.

2. An article positioning apparatus as set forth in claim 1, wherein said magnetic coupling means comprises a positioning pin stored in one of said supporting base side or said article side, a positioning hole provided at the opposite side to said positioning pin, and a pin driving magnetic member movable relative to said positioning pin so that said pin driving magnetic member applies the magnetic drawing force or the magnetic repulsive force to said positioning pin at the mating position resulting in said positioning pin engaging said positioning hole.

3. An article processing apparatus comprising:

a first rotary body for rotation;

a plurality of transporting means provided on said first rotary body with a circumferential regular interval and holding and transporting a holder receiving a container;

a second rotary body rotated in synchronism with said first rotary body;

a plurality of guide members disposed on said second rotary body with a circumferential regular interval and said guide members guiding radial movement of said holder;

a magnetic arranged below the motion path of each of said guide members and drawing the holder engaging with said guide member to position said holder at a predetermined position in the radial direction;

each of said transporting means including a pivoting arm disposed on said first rotary body, a pivot mechanism for pivoting said arm in synchronism with rotation of said first rotary body, a holding member provided rotatably on said arm and holding said holder, and rotating mechanism for driving said holding member in synchronism with rotation of said first rotary body; and said transporting means transferring the holder held in said holding member to each of said guide members of said second rotary member by a pivoting motion of said arm and rotation of said holding member.

* * * * *